US008459399B2

(12) United States Patent
Ohashi

(10) Patent No.: US 8,459,399 B2
(45) Date of Patent: Jun. 11, 2013

(54) FUEL CELL SYSTEM AND VEHICLE

(75) Inventor: Yasuhiko Ohashi, Toyota (JP)

(73) Assignee: Toyota Jidosha Kabushiki Kaisha, Toyota-shi (JP)

(*) Notice: Subject to any disclaimer, the term of this patent is extended or adjusted under 35 U.S.C. 154(b) by 0 days.

(21) Appl. No.: 13/258,539

(22) PCT Filed: May 28, 2009

(86) PCT No.: PCT/JP2009/059777
§ 371 (c)(1),
(2), (4) Date: Sep. 22, 2011

(87) PCT Pub. No.: WO2010/137149
PCT Pub. Date: Dec. 2, 2010

(65) Prior Publication Data
US 2012/0006607 A1    Jan. 12, 2012

(51) Int. Cl.
*B62D 21/00* (2006.01)
*B62D 25/20* (2006.01)
(52) U.S. Cl.
USPC .......................... 180/312; 280/784; 296/204
(58) Field of Classification Search
USPC .............. 180/65.31, 232, 291, 298, 299, 312;
280/784, 785, 124.109; 296/187.08, 193.07,
296/204
See application file for complete search history.

(56) References Cited

U.S. PATENT DOCUMENTS

| 5,515,939 | A  | * | 5/1996  | Korall et al. ............... 180/283 |
| 6,819,066 | B2 | * | 11/2004 | Ishikawa et al. ............. 318/139 |
| 8,037,960 | B2 | * | 10/2011 | Kiya ............................. 180/68.5 |
| 8,330,429 | B2 | * | 12/2012 | Arakawa ....................... 320/166 |
| 2006/0113131 | A1 |  | 6/2006 | Kato et al. |
| 2006/0272877 | A1 | * | 12/2006 | Nozaki et al. ................ 180/291 |
| 2007/0007060 | A1 |  | 1/2007 | Ono et al. |
| 2008/0196957 | A1 | * | 8/2008 | Koike et al. .................. 180/68.5 |

FOREIGN PATENT DOCUMENTS

| JP | 07-108956 A | 4/1995 |
| JP | 7-117489 A | 5/1995 |
| JP | 10-291419 A | 11/1998 |
| JP | 2002-367648 A | 12/2002 |
| JP | 2003-146087 A | 5/2003 |
| JP | 2003-189415 A | 7/2003 |
| JP | 2004-161092 A | 6/2004 |

(Continued)

OTHER PUBLICATIONS

Machine Translation of JP 2007-106361 A (cited in the IPER and Mar. 6, 2012 IDS).*

(Continued)

*Primary Examiner* — Joseph Rocca
(74) *Attorney, Agent, or Firm* — Kenyon & Kenyon LLP

(57) ABSTRACT

Provided is a mounting structure of a fuel cell system capable of inhibiting a related device from colliding with the fuel cell when a crash impact is applied from the vehicle front while inhibiting the increase in the vehicle weight. The fuel cell system includes a fuel cell, and a related device electrically connected to the fuel cell and disposed adjacent to the, wherein related device has an inclined part on a side of a forward direction of a vehicle. When a crash impact is applied to the vehicle from the forward direction side, the moving direction of the related device is changed to a direction (for example, downward) that is not parallel to the forward direction. Thus, it is possible to inhibit the related device from advancing directly toward and damaging the fuel cell.

9 Claims, 15 Drawing Sheets

FOREIGN PATENT DOCUMENTS

| | | |
|---|---|---|
| JP | 2004-345447 A | 12/2004 |
| JP | 2005-205945 A | 8/2005 |
| JP | 2005-231549 A | 9/2005 |
| JP | 2005-306104 A | 11/2005 |
| JP | 2006-168604 A | 6/2006 |
| JP | 2006-176105 A | 7/2006 |
| JP | 2006-196386 A | 7/2006 |
| JP | 2006-256442 A | 9/2006 |
| JP | 2006-335212 A | 12/2006 |
| JP | 2007-015591 A | 1/2007 |
| JP | 2007-015600 A | 1/2007 |
| JP | 2007-015612 A | 1/2007 |
| JP | 2007-015613 A | 1/2007 |
| JP | 2007-015614 A | 1/2007 |
| JP | 2007-015616 A | 1/2007 |
| JP | 2007-039004 A | 2/2007 |
| JP | 2007-106361 A | 4/2007 |
| JP | 2007-209161 A | 8/2007 |
| JP | 2007-230329 A | 9/2007 |
| JP | 2007-237779 A | 9/2007 |
| JP | 2007-245954 A | 9/2007 |
| JP | 2007-258164 A | 10/2007 |
| JP | 2007-318938 A | 12/2007 |
| JP | 2008-100584 A | 5/2008 |
| JP | 2008-100585 A | 5/2008 |
| JP | 2009-023528 A | 2/2009 |
| JP | 2009-083598 A | 4/2009 |
| JP | 2009-148051 A | 7/2009 |
| WO | 03/104010 A1 | 12/2003 |
| WO | 2009/001483 A1 | 12/2009 |

OTHER PUBLICATIONS

International Search Report issued Jul. 21, 2009 of PCT/JP2009/059779.
International Search Report issued Jul. 21, 2009 of PCT/JP2009/059774.
International Search Report issued Jul. 21, 2009 of PCT/JP2009/059777.
International Search Report issued Jul. 21, 2009 of PCT/JP2009/059785.

* cited by examiner

FUEL CELL SYSTEM AND VEHICLE

This is a 371 national phase application of PCT/JP2009/059777 filed May 28, 2009, the contents of which are incorporated herein by reference.

TECHNICAL FIELD

The present invention relates to a vehicle mounted with a fuel cell system, and particularly relates to a mounting structure of a fuel cell and a related device of a fuel cell such as a DC/DC converter.

BACKGROUND ART

A vehicle (hereinafter also referred to as a "fuel cell vehicle") configured to travel by supplying power from a fuel cell system and driving a vehicle drive motor is developed. With a fuel cell vehicle, safety during collision is ensured by disposing the components of the fuel cell system underneath the floor of the center of the vehicle.

For example, JP-A-2005-205945 discloses a vehicle mounting structure which adjacently arranges a fuel cell unit and an auxiliary unit underneath the vehicle body floor which is enclosed by a floor frame provided in a vehicle front-back direction of a fuel cell vehicle, and a cross member provided in a vehicle width direction. According to this structure, the tubing length and wiring length can be shortened, and the collision safety can be ensured (Patent Literature 1).

JP-A-2004-161092 discloses a structure of disposing a fuel cell box retaining a fuel cell and a fuel gas dilution box, and a sub frame retaining a fuel gas tank in a fore and aft juxtaposition. In particular, the fuel gas dilution box is disposed closer to the sub frame side than the fuel cell in the fuel cell box. According to this configuration, the collision energy that is applied to the sub frame during the collision of a vehicle is absorbed by the deformation of the fuel gas dilution box (Patent Literature 2).

JP-A-2007-015612 discloses a frame structure comprising a pair of left and right center frames provided so as to support the center console at the center position of the vehicle, and a pair of left and right side frames provided outside the center frames in the vehicle width direction. The fuel cell stack is housed in the center console, and the DC-DC converter is stored in the area between the center frames and the side frames in the vehicle width direction (Patent Literature 3).

A DC-DC converter which subjects the output voltage of a fuel cell to pressure rising or pressure lowering is disclosed, for example, in JP-A-2007-209161 and JP-A-2007-318938 (Patent Literature 4 and Patent Literature 5).

CITATION LIST

Patent Literatures

[Patent Literature 1] JP-A-2005-205945
[Patent Literature 2] JP-A-2004-161092
[Patent Literature 3] JP-A-2007-015612
[Patent Literature 4] JP-A-2007-209161
[Patent Literature 5] JP-A-2007-318938

SUMMARY OF INVENTION

Technical Problem

Nevertheless, with the mounting structures of the foregoing conventional technologies, it was not possible to sufficiently protect the fuel cell from the impact of a collision of an object from the front surface and other directions of the fuel cell vehicle.

For example, with the technology described in Patent Literature 1, the floor frame once absorbs the impact of the side collision and alleviates the impact to the fuel cell unit. However, depending on the strength of the impact of the side collision or the height of the object, the object could reach the mounting position of the fuel cell unit.

With the technology described in Patent Literature 2, even if the fuel gas dilution box is able to absorb most of the impact, it was not possible to prevent the fuel gas dilution box from moving and coming in contact with the fuel cell. Thus, there was a possibility that the fuel gas would leak from the inside of the fuel cell and become ignited by a spark.

With the technology described in Patent Literature 3, since the center frame was structured to resist the movement of the DC-DC converter, it is effective in that the crash impact could be absorbed only with damage to the DC-DC converter. Nevertheless, if the crash impact is significant, the impact would cause the center frame to deform, and there was a possibility that the fuel cell stack would be destroyed and the fuel gas would leak from the fuel cell stack.

Since the DC-DC converter described in Patent Literature 4 and Patent Literature 5 is a peripheral device provided in the vicinity of a fuel cell, if there is any defect in the mounting structure thereof, there is a possibility that it would run into the fuel cell due to the impact during the vehicle collision and cause fuel gas leakage.

In order to deal with the foregoing inconveniences, considered may be a scheme of disposing a structure with extremely high rigidity between the fuel cell and the related device in order to increase the impact resistance of the fuel cell. Nevertheless, protective measures using an extremely heavy and rigid structure cannot be adopted in vehicles with a weight limitation. It is necessary to effective protect the fuel cell while inhibiting the increase in the vehicle weight.

Solution to Problem

Thus, an object of this invention is to provide a mounting structure of a fuel cell system capable of inhibiting a related device of the fuel cell from colliding with the fuel cell while inhibiting the increase in the vehicle weight.

The first feature of the fuel cell system of the present invention which resolves the foregoing problems is a fuel cell system mounted on a vehicle comprising a fuel cell, and a related device electrically connected to the fuel cell and disposed adjacent to the fuel cell, wherein the related device comprises an inclined part on a side of a forward direction of the vehicle.

According to the foregoing configuration, when a crash impact is applied to the vehicle from the forward direction side, the moving direction of the related device is changed to a direction that is not parallel to the forward direction. In other words, when the member that was subject to the crash impact before the related device comes in contact with the inclined part of the foregoing related device, the moving direction of the member will change since the contact portion is sloped. Since the member is directly or indirectly connected to the related device, the related device moves in a direction (for example, downward) that is not parallel to the forward direction in conjunction with the movement of the member. Thus, it is possible to inhibit the related device from directly reaching the fuel cell and damaging the fuel cell.

The second feature of the fuel cell system of the present invention is that the related device is fixed to the vehicle by at least two fastening members which are mutually spaced along the forward direction, and, of the at least two fastening members, the fastening member that is provided on the forward direction side is configured to be unfastened with weaker force than the fastening member that is provided on an opposite side to the forward direction side.

According to the foregoing configuration, when a crash impact is applied to the vehicle from the forward direction side, of the fastening members that are fixed to the related device, the fastening member that is provided to the forward direction side is unfastened first due to the impact. Thus, the related device moves in a direction of rotating around the fastening member that is not unfastened, and will not approach the fuel cell. Thus, it is possible to inhibit the related device from directly reaching the fuel cell and damaging the fuel cell.

The third feature of the fuel cell system of the present invention is that the related device is provided with a protruding part on the fuel cell side, and the protruding part is provided at a position where this part comes in contact with an electrode terminal of the fuel cell based on the movement of the related device expected in a case where the vehicle collides.

According to the foregoing configuration, when a crash impact is applied to the vehicle from the forward direction side, the protruding part collides with the electrode terminal of the fuel cell pursuant to the movement of the related device. As a result of this collision, the electrode terminal becomes deformed and the fuel cell is electrically short circuited. Thus, even if the related device damages the fuel cell and the fuel gas is leaked, a spark will not be generated, and it is possible to inhibit the inconveniences that could occur due to the breakage of the fuel cell.

The foregoing first to third features can be used independently or in a combination of two or more features.

The following elements can be added to the present invention as needed.

(1) Preferably, the related device comprises, on the fuel cell side, a short circuit part configured to be capable of short-circuiting a power source of the related device when force of a certain level or higher is applied (fourth feature).

According to the foregoing configuration, since the power source of the related device will be short circuited as a result of the related device coming in contact with a part of the fuel cell, even if the related device damages the fuel cell and the fuel gas is leaked, a spark will not be generated, and it is possible to inhibit the inconveniences that could occur due to the breakage of the fuel cell.

(2) Preferably, the short circuit part is provided at a position where it will come in contact with a part of the fuel cell based on the movement of the related device that is anticipated when the vehicle collides.

According to the foregoing configuration, it is possible to increase the possibility of short circuiting the power source when force of a certain level or higher is applied to the short circuit part during the collision.

(3) Preferably, a shock absorbing member is provided between the related device and the fuel cell.

According to the foregoing configuration, since the shock absorbing member will buffer the impact when the fuel cell and the related device come in contact, it is possible to effectively inhibit the fuel cell from becoming damaged.

(4) Preferably, the related device is a converter that is electrically connected to the fuel cell.

Since the converter is a voltage converting means for converting the output voltage of the fuel cell, it is often provided adjacent to the fuel cell.

(5) The present invention is also a vehicle comprising the fuel cell system having the foregoing features.

By mounting the fuel cell system of the present invention, even if the vehicle were to collide, it is possible to inhibit the possibility of damaging the fuel cell or the possibility of causing inconvenience even if the fuel cell is damaged.

Advantageous Effects of Invention

According to the present invention, since the moving direction of the related device is changed to a direction that is not parallel to the forward direction, it is possible to inhibit the related device from damaging the fuel cell.

BRIEF DESCRIPTION OF DRAWINGS

FIG. 8 is a functional explanatory diagram in Embodiment 1, wherein

FIG. 9 is a shutoff function explanatory diagram of the converter assembly in Embodiment 1, wherein

FIG. 13 is a functional explanatory diagram in Embodiment 2, wherein

DESCRIPTION OF EMBODIMENTS

The preferred embodiments for working the present invention are now explained with reference to the appended drawings.

In the following description of the drawings, the same or similar reference number is given to the same or similar component. The drawings, however, are schematic. Accordingly, the specific dimensions and the like should be determined in light of the ensuing explanation. Moreover, it goes without saying that the relationship or ratio of the mutual dimensions may also differ among the respective drawings.
(Definitions)

The terms used in the present invention shall be defined as follows.

"Mobile object": A structure that can move by utilizing the generated output of the fuel cell, regardless of the principle of motion, and regardless of whether it is manned.

"Vehicle": The body of an automobile as an example of the mobile object of the present invention.

"Front": The advancing direction when the vehicle is shifted to drive, and this is also referred to as the "forward direction" or "front side".

"Rear": The advancing direction when the vehicle is shifted to reverse (backward), and this is also referred to as the "reverse direction" or "rear side".

"Lateral": The lateral direction in a horizontal plane relative to the foregoing forward direction or reverse direction, and this also referred to as the "lateral direction" or "width direction".

"Up": In relation to the height direction of the vehicle, the upward direction (upper direction in the side view and front view of FIG. 2) is referred to as the "upper direction" or "upper side", and the downward direction (road surface direction of the vehicle 100 and lower direction of the side view and front view of FIG. 2) is referred to as the "lower direction" or the "lower side".

"Related device": Components other than the fuel cell that configure the fuel cell system, regardless of the type of component. The term "related device" includes a converter, an auxiliary inverter, a vehicle drive inverter, a cooling pump, a drive pump, a compressor, a battery and the like. A "related device" does not necessarily have to be electrically connected to the fuel cell.

"Adjacent": "Adjacent" means that the distance between the fuel cell and the related device is close, but there is no limitation in such distance. However, if a crash impact is applied without the application of the present invention, "Adjacent" is the distance in which the related device could physically affect the fuel cell.
(Embodiment 1)

Embodiment 1 of the present invention relates to a converter assembly applying the first to fourth features in the fuel cell system of the present invention to a DC-DC converter as the related device. The configuration of the fuel cell system is foremost explained, and the converter assembly is subsequently explained in detail.
(System Configuration)

Figure 1:
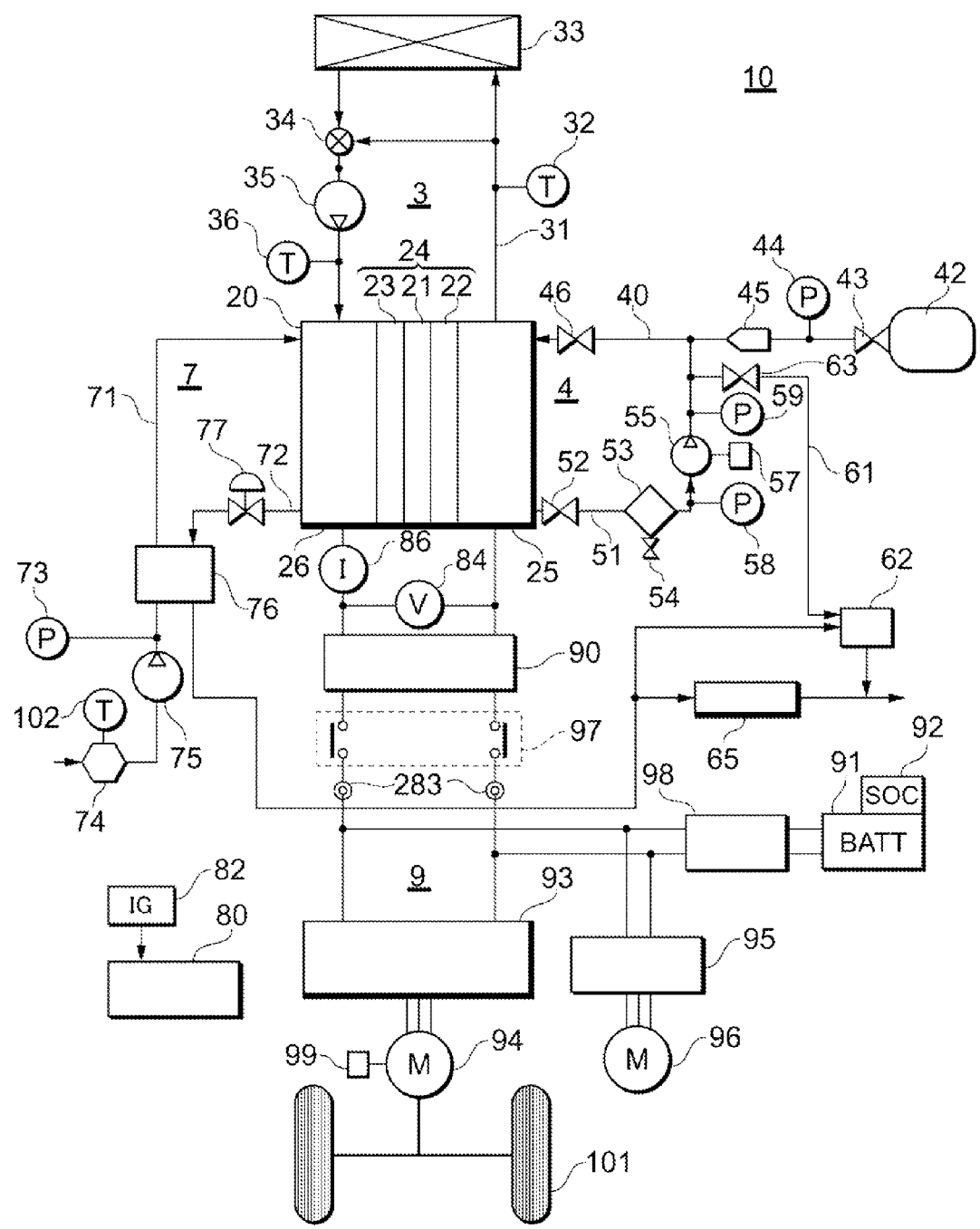
FIG. 1 is a system configuration diagram of the fuel cell system according to an embodiment of the present invention.

FIG. 1 is a configuration diagram of the fuel cell system to which the present invention is applied.

A fuel cell system 10 in FIG. 1 is configured by comprising a fuel gas supply system 4, an oxidation gas supply system 7, a coolant supply system 3, and an electric power system 9. The fuel gas supply system 4 is a system for supplying fuel gas (hydrogen gas) to a fuel cell 20. The oxidation gas supply system 7 is a system for supplying oxidation gas (air) to the fuel cell 20. The coolant supply system 3 is a system for cooling the fuel cell 20. The electric power system 9 is a system for charging and discharging the generated output from the fuel cell 20.

The fuel cell 20 comprises a membrane electrode assembly (MEA) 24, which is formed by screen printing an anode electrode 22 and a cathode electrode 23, on either face of a polymer electrolyte membrane 21 made from a proton conducting ion exchange membrane or the like formed from fluorinated resin or the like. Either face of the membrane electrode assembly 24 is sandwiched by a separator (not shown) with a flow passage of fuel gas, oxidation gas, and coolant. A groove-shaped anode gas channel 25 and a cathode gas channel 26 are respectively formed between the separator, and the anode electrode 22 and the cathode electrode 23. The anode electrode 22 is configured by providing a fuel electrode catalytic layer on a spongy support layer, and the cathode electrode 23 is configured by providing an air electrode catalytic layer on a spongy support layer. The catalytic layer of these electrodes is configured, for example, by being affixed with platinum particles. The fuel cell 20 generates the electrochemical reaction shown in Formulae (1) to (3) below.

$$H_2 \rightarrow 2H^+ + 2e^- \quad (1)$$

$$(1/2)O_2 + 2H^+ + 2e^- \rightarrow H_2O \quad (2)$$

$$H_2 + (1/2)O_2 \rightarrow H_2O \quad (3)$$

On the anode electrode 22 side, the reaction shown in Formula (1) is generated. On the cathode electrode 23 side, the reaction shown in Formula (2) is generated. As the overall fuel cell 20, the reaction shown in Formula (3) is generated. In order to generate this kind of electrochemical reaction, the fuel cell 20 is mounted on a vehicle in the form of a fuel cell unit by being housed in a housing described later.

Note that, for the convenience of explanation, FIG. 1 schematically shows a unit cell structure configured from a membrane electrode assembly 24, an anode gas channel 25 and a cathode gas channel 26. In reality, the unit cell structure comprises a stack structure in which a plurality of unit cells (cell group) are connected in series via the foregoing separator.

The coolant supply system 3 of the fuel cell system 10 comprises a cooling passage 31, temperature sensors 32 and 35, a radiator 33, a valve 34, and a coolant pump 35. The cooling passage 31 is a flow passage for circulating the coolant. The temperature sensor 32 is a temperature detection means for detecting the temperature of the coolant that is drained from the fuel cell 20. The radiator 33 is a heat exchanger for radiating the heat of the coolant to the outside. The valve 34 is a valve means for regulating the amount of coolant to flow into the radiator 33. The coolant pump 35 is a drive means for pressurizing and circulating the coolant with a motor not shown. The temperature sensor 36 is a temperature detection means for detecting the temperature of the coolant supplied to the fuel cell 20.

The fuel gas supply system 4 of the fuel cell system 10 comprises a fuel gas supply unit 42, a fuel gas supply line 40, and a circulation pathway 51. The fuel gas supply unit 42 is a storage means for storing fuel gas (anode gas) such as hydrogen gas. The fuel gas supply line 40 is a flow passage means for supplying the fuel gas from the fuel gas supply unit 42 to the anode gas channel 25. The circulation pathway 51 is a flow passage means (circulation pathway) for circulating the fuel off-gas discharged from the anode gas channel 25 in the fuel gas supply line 40.

The fuel gas supply unit 42 is configured, for example, from a high pressure hydrogen tank, hydrogen storing alloy, reformer or the like. In this embodiment, the fuel gas supply unit 42 comprises a first fuel gas tank 42a and a second fuel gas tank 42b. The fuel gas supply line 40 is mounted with a root valve 43, a pressure sensor 44, an injector 45, and a shutoff valve 46. The root valve 43 is a shutoff valve for controlling the flow of fuel gas from the fuel gas supply unit 42. The pressure sensor 44 is a pressure detection means for detecting the relatively high pressure of the fuel gas in the piping which is downstream of the root valve 43 and upstream of the injector 45. The injector 45 is a regulating valve for regulating the fuel gas pressure within the circulation pathway 51. The shutoff valve 46 is a valve means for controlling the supply/non-supply of fuel gas to the fuel cell 20.

The circulation pathway 51 comprises a shutoff valve 52, a gas-liquid separator 53, an exhaust valve 54, and a hydrogen pump 55. The shutoff valve 52 is a valve means for controlling the supply/non-supply of the fuel off-gas from the fuel cell 20 to the circulation pathway 51. The gas-liquid separator 53 is a separation means for eliminating the moisture contained in the fuel off-gas. The exhaust valve 54 is a valve means for discharging the moisture that was separated by the gas-liquid separator 53 to the outside. The hydrogen pump 55 comprises a motor not shown, and is a drive means as a forced circulator which compresses the fuel off-gas that was subject to pressure loss upon passing through the anode gas channel 25 and, as a result, raises the fuel off-gas to an appropriate gas pressure, and circulates the fuel off-gas in the fuel gas supply line 40. Based on the drive of the hydrogen pump 55, the fuel off-gas converges with the fuel gas supplied from the fuel gas supply unit 42 at the junction of the fuel gas supply line 40 and the circulation pathway 51, and is supplied to the fuel cell 20 and reused. Note that the hydrogen pump 55 is mounted with a rotational speed sensor 57 for detecting the rotational speed of the hydrogen pump 55, and pressure sensors 58, 59 for detecting the pressure of the circulation pathway before and after the hydrogen pump 55.

In addition, the circulation pathway 51 is piped with an exhaust flow passage 61 in a branched manner. The exhaust flow passage 61 is provided with a purge valve 63 and a diluter 62, and is a discharge means for discharging the fuel off-gas discharged from the fuel cell 20 to the outside of the vehicle. The purge valve 63 is a valve means for controlling the discharge of the fuel off-gas. As a result of opening and closing the purge valve 63, the circulation within the fuel cell 20 is repeated and the fuel off-gas with an increased impurity concentration is discharged outside, and deterioration of the cell voltage can be prevented by introducing new fuel gas. The diluter 62 is a dilution means for diluting the fuel off-gas with oxidation off-gas to a concentration where no oxidation reaction will occur, and, for example, is a hydrogen concentration reduction device.

Meanwhile, the oxidation gas supply system 7 of the fuel cell system 10 is piped with an oxidation gas supply line 71, and an oxidation off-gas exhaust passage 72. The oxidation gas supply line 71 a flow passage means for supplying oxidation gas (cathode gas) to the cathode gas channel 26. The oxidation off-gas exhaust passage 72 is a flow passage means for discharging the oxidation off-gas (cathode off-gas) discharged from the cathode gas channel 26.

The oxidation gas supply line 71 is provided with an air cleaner 74, and an air compressor 75. The air cleaner 74 is a suction means and filtration means for sucking in and filtering air from the atmosphere and supplying it to the oxidation gas supply line 71. The air compressor 75 is a drive means which compresses the sucked air with a motor not shown, and delivers the compressed air as oxidation gas to the cathode gas channel 26. The air compressor 75 is mounted with a pressure sensor 73 for detecting the air supply pressure of the air compressor 75.

A humidifier 76 is provided between the oxidation gas supply line 71 and the oxidation off-gas exhaust passage 72. The humidifier 76 exchanges humidity between the oxidation gas supply line 71 and the oxidation off-gas exhaust passage 72, and raises the humidity of the oxidation gas supply line 71.

The oxidation off-gas exhaust passage 72 is provided with a pressure regulating valve 77, and a muffler 65. The pressure regulating valve 77 is a pressure regulating means that functions as a regulator for regulating the discharge pressure of the oxidation off-gas exhaust passage 72. The muffler 65 is a silencing means for absorbing the exhaust sound of the oxidation off-gas. The oxidation off-gas discharged from the pressure regulating valve 77 is branched. One of the branched oxidation off-gas flows into the diluter 62, and is mixed and diluted with the fuel off-gas retained in the diluter 62. The other branched oxidation off-gas is subject to sound absorption by the muffler 65, and mixed with the gas that was mixed and diluted by the diluter 62 and discharged outside the vehicle.

Connected to the electric power system 9 of the fuel cell system 10 are a voltage sensor 84, a current sensor 86, fuel cell DC-DC converter 90, a battery 91, a battery computer 92, an inverter 93, a vehicle drive motor 94, an inverter 95, a high voltage auxiliary machine 96, a relay 97, and a battery DC-DC converter 98. These are the "related devices" in this embodiment.

The fuel cell DC-DC converter (hereinafter referred to as the "FC converter") 90 is a voltage converting means for converting the voltage between the primary-side terminal and the secondary-side terminal. Specifically, an output terminal of the fuel cell 20 is connected to the primary-side terminal, and the inverter 93 is connected to the secondary-side terminal. Moreover, the battery DC-DC converter (hereinafter referred to as the "battery converter") 98 is also a voltage converting means for converting the voltage between the primary-side terminal and the secondary-side terminal. Specifically, an output terminal of the battery 91 is connected to the primary-side terminal, the secondary-side terminal is connected to an input terminal of the inverter 93, and is connected to the FC converter 90 in series.

The FC converter 90 raises the output voltage of the fuel cell 20 connected to a primary-side terminal, and supplies this to an input terminal of the inverter 93 connected to a secondary-side terminal. When the generated output of the fuel cell 20 is insufficient, the battery converter 98 raises the output voltage of the battery 91 connected to the primary-side terminal and supplies this to the input terminal of the inverter 93 connected to the secondary-side terminal. Moreover, if surplus electricity is generated in the fuel cell 20, the surplus electricity of the fuel cell 20 is charged in the battery 91 via the FC converter 90 and the battery converter 98. In addition, if regenerative electric power is generated due to a braking operation to the vehicle drive motor 94, the regenerative electric power is charged in the battery 91 via the battery converter 98.

The FC converter 90 comprises a relay 97 in the secondary-side terminal. The relay 97 is configured to maintain a conductive connection in a normal state. However, when a given impact is applied to the FC converter 90, the relay 97 becomes a blocked state, and is configured so that the secondary-side terminal of the FC converter 90 is electrically disconnected from the inverter 93, the inverter 95, and the battery converter 98.

Moreover, the secondary-side terminal of the FC converter 90 is configured to be electrically connected, via a power plug 283, to the input terminal of the inverter 93 and the inverter 95, and the secondary-side terminal of the battery converter 98.

The battery 91 is an electrical storage device for charging surplus electricity and regenerative electric power as a secondary battery. The battery computer 92 is a monitoring means for monitoring the charging state of the battery 91. The inverter 93 is a DC-AC conversion means for converting the direct current supplied via the FC converter 90 or the battery converter 98 into a three-phase alternating current, and supplying this to the vehicle drive motor 94 to be driven. The vehicle drive motor 94 is the main drive means of the fuel cell vehicle, and is a drive means that is driven by the three-phase alternating current from the inverter 93. The inverter 95 is a DC-AC conversion means for supplying an alternating current to the various high voltage accessories 96 configuring the fuel cell system 10. The high voltage auxiliary machine 96 is a collective designation of the drive means that uses a motor other than the vehicle drive motor 94. Specifically, the high voltage auxiliary machine 96 is motors such as the coolant pump 35, the hydrogen pump 55, the air compressor 75.

The voltage sensor 84 is a voltage detection means for detecting the output voltage of the fuel cell 20, and the current sensor 86 is a current detection means for measuring the output current of the fuel cell 20. The voltage sensor 84 and the current sensor 86 are used for detecting the output voltage and output current of the fuel cell 20.

The high voltage auxiliary machine Note that the vehicle drive motor 94 is mounted with a rotational speed sensor 99 for detecting the rotational speed of the vehicle drive motor 94. The vehicle drive motor 94 is mechanically joined with a front tire 101 as a wheel via a differential, and can covert the torque of the vehicle drive motor 94 into the driving power of the vehicle.

In addition, the fuel cell system 10 is mounted with a control unit 80 for controlling the overall power generation of the fuel cell system 10. The control unit 80 is configured as a general-purpose computer comprising a CPU (central processing unit), a RAM, a ROM, an interface circuit and the like not shown. The control unit 80 may be configured from one computer or configured from a plurality of computers that work together. The control unit 80 performs, for example, the following types of control, but is not limited thereto:

(1) to input a switch signal from the ignition switch 82 and start or stop the fuel cell system 10;

(2) to capture a detection signal of the gas pedal not shown and the shift position and a rotational speed signal from the rotational speed sensor 99 and computer control parameters such as the power required by the system as the required power supply amount;

(3) to control the rotational speed of the air compressor 75 so that the amount of oxidation gas that is supplied to the oxidation gas supply line 71 becomes an appropriate amount based on the relative value of the pressure of the oxidation gas supply line 71 detected by the pressure sensor 73;

(4) to control the opening of the pressure regulating valve 77 so that the amount of oxidation off-gas that is discharged from the oxidation off-gas exhaust passage 72 becomes an appropriate amount;

(5) to adjust the opening of the root valve 43 or regulate the regulated pressure of the injector 45 so that the amount of oxidation gas that is supplied to the fuel gas supply line 40 becomes an appropriate amount based on the relative value of the pressures detected by the pressure sensors 44, 58, 59;

(6) to control the rotational speed of the hydrogen pump 55 and control the opening of the purge valve 63 so that the amount of fuel off-gas that is circulated in the circulation pathway 51 becomes an appropriate amount while monitoring the value of the rotational speed sensor 57;

(7) to control the opening and closing of the root valve 43, the shutoff valve 46, the shutoff valve 52 and the like according to the driving mode;

(8) to computer the circulation amount of the coolant based on the relative value of the coolant temperature detected by the temperature sensors 32, 36, and control the rotational speed of the coolant pump 35;

(9) to calculate the AC impedance of the fuel cell 20 based on the voltage value detected by the voltage sensor 84 and the current value detected by the current sensor 86, estimate and compute the water content of the electrolyte membrane, and control the scavenging amount when the vehicle is stopped; and

(10) to control the electric power system 9; for example, to control the FC converter 90, the battery converter 98, the inverters 93 and 95, the vehicle drive motor 94, the high voltage auxiliary machine 96, and so on.

(Arrangement of Fuel Cell System in Vehicle)

Figure 2:
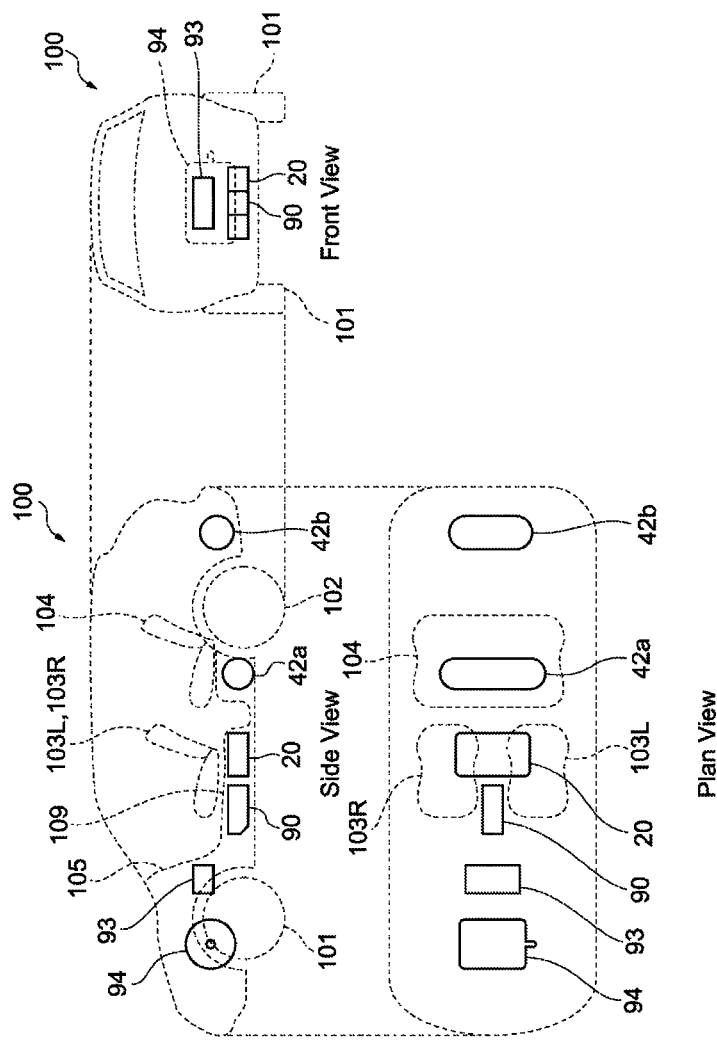
FIG. 2 is a side view, plan view and front view explaining the arrangement of the respective units of the fuel cell system in the vehicle in Embodiment 1.

The configuration of the fuel cell assembly in Embodiment 1 is now explained with reference to FIG. 2 to FIG. 7. FIG. 2 shows the vehicle structure and the arrangement of the fuel cell system in Embodiment 1. FIG. 2 shows a side view, a plan view, and a front view.

As shown in the side view and plan view of FIG. 2, the outline of the vehicle 100, the front tire 101, the rear tire 102, the front seat 103, and the rear seat 104 is shown with a dashed line. As shown in the side view of FIG. 2, a dashboard 105 which partitions the compartment where the passenger is to climb in is shown with a bold dashed line. The respective components configuring the fuel cell system 10 are shown with a solid line. In FIG. 2, among the respective devices configuring the fuel cell system 10, in particular the arrangement of the fuel cell 20, the FC converter 90, the inverter 93, the vehicle drive motor 94, and the first fuel gas tank 42a is illustrated.

As shown in the side view of FIG. 2, the respective components of the fuel cell system 10 are arranged at the bottom surface part of the vehicle 100 that is partitioned by the dashboard 105. The fuel cell 20 is disposed at approximately the center portion in the front-back direction and left-right direction of the vehicle, immediately below the front seat 103 in this embodiment. Since the FC converter 90 is directly connected to an output terminal of the fuel cell 20, it is disposed adjacent to the fuel cell 20 and on the front side of the fuel cell 20. In order to widen the feet area of the passenger, the dashboard 105 is provided with a tunnel part 109 protruding in a front-back direction between a right-side front seat 103R and a left-side front seat 103L. The FC converter 90 is housed in the tunnel part 109. The vehicle drive motor 94 is disposed in the vicinity of the front tire 101 and on the front side of the vehicle 100 in order to drive the front tire 101. The inverter 93 is disposed in the vicinity of the vehicle drive motor 94 in order to supply power to the vehicle drive motor 94. The first fuel gas tank 42a is disposed on the rear side of the fuel cell 20 in order to supply fuel gas to the fuel cell 20.

As described above, the fuel cell 20 and the FC converter 90 are disposed at the lower side of the approximate center of the vehicle 100, and surrounded by a frame (described later) extending in the front-back direction of the vehicle 100 and a cross member (described later) extending in the width direction of the vehicle 100. Thus, the fuel cell 20 and the FC converter 90 are provided at a position where they will not easily break even with a collision from the lateral direction in addition to a collision from the foreside of the vehicle 100. In particular, since the FC converter 90 corresponds to a related device of the present invention and comprises an inclined part at the front side of the vehicle 100, it possesses extremely high tolerance against collision from the forward direction.

Note that, in the ensuing explanation, the fuel cell 20 is mounted on the vehicle 100 in the mode of the fuel cell assembly 200, and the FC converter 90 is mounted on the vehicle 100 in the mode of the converter assembly 250, respectively. The converter assembly 250 corresponds to a "related device" in the present invention.

(Vehicle Structure)

Figure 3:
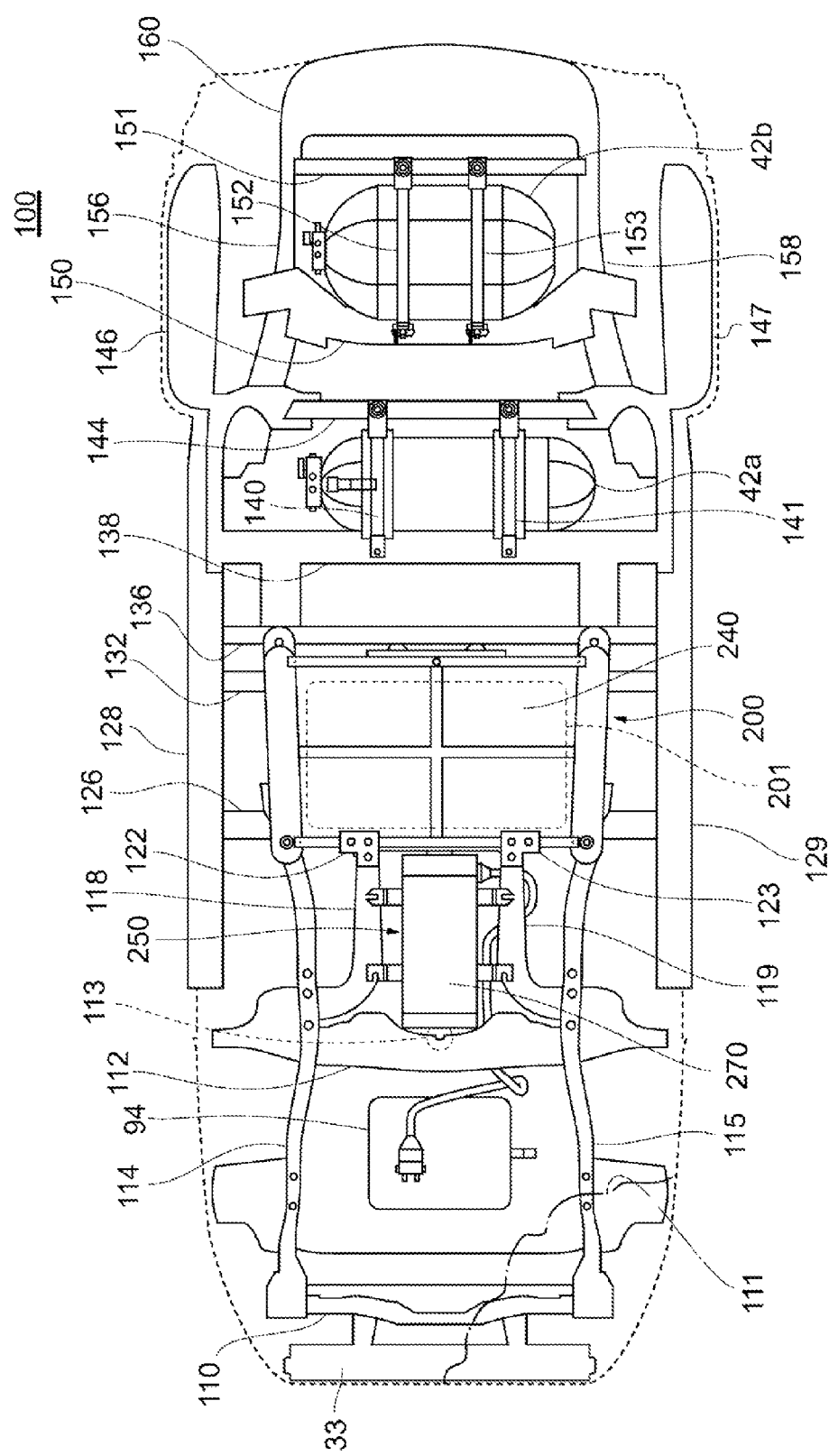
FIG. 3 is a vehicle bottom view explaining the arrangement of the fuel cell system in Embodiment 1.

FIG. 3 shows the vehicle bottom view including the arrangement of the fuel cell system in Embodiment 1. Let it be assumed that the various components such as the frames, members and pillars explained below are configured from metal materials with given rigidity; for example, aluminum, SUS, steel or the like. The metal materials may be arbitrarily selected from the perspective of ease of workability, strength, tolerance, weight, cost and so on. The metal materials may be subject to well-known hardening treatment such as quenching or alloying.

As shown in FIG. 3, a floor panel 111 is laid across the front face of the bottom surface of the vehicle 100. In the front part of the vehicle 100, front frames 114 and 115 are provided in an extending manner at the bottom part, and form the framework structure of the front part of the vehicle 100. A front cross member 110 is provided at the foremost part of the front frames 114 and 115, and the radiator 33 shown in FIG. 1 is additionally mounted. A front suspension member 112 is provided at the rear side of the front cross member 110. The front suspension member 112 is fastened to the front frames 114 and 115. The vehicle drive motor 94 shown in FIG. 1 and FIG. 2 is disposed in the area surrounded by the front cross member 110 and the front suspension member 112.

The fuel cell assembly 200 is fastened to the front frames 114 and 115 at the front side of the vehicle, and fastened to a third cross member 136 at the rear side of the vehicle. As shown in FIG. 3, a pair of sub frames 118 and 119 is extending from the rear of the fastened position of the front suspension member 112 of the front frames 114 and 115 toward the fuel cell assembly 200. The ends of the sub frames 118 and 119 are fastened to the protective structure 220 (explained with reference to FIG. 5 onward) of the fuel cell assembly 200 together with brackets 122 and 123. A converter assembly 250 (explained with reference to FIG. 5 onward) is disposed between the pair of sub frames 118 and 119. The converter assembly 250 is fastened to the sub frames 118 and 119. Note that, in FIG. 3, the illustration of the panel provided to the back surface of the protective structure 220 is omitted.

At the center of the vehicle 100, side rocker members 128 and 129 are provided to the side face of the vehicle 100. A first cross member 126, a second cross member 132, and a third cross member 136 are placed across and fastened to the side rocker members 128 and 129 from the front side to the rear side, and form a rigid structure against the impact from the lateral direction of the center of the vehicle. The fuel cell assembly 200 relates to the present invention and is disposed between the first cross member 126 and the third cross member 136 in the front-back direction and disposed between the front frame 114 and the front frame 115 in the width direction.

Rear rocker members 146 and 147 are extending from the rear side of the side rocker members 128 and 129 to the periphery of the rear tire 102 at the rear part of the vehicle 100. A fourth cross member 138, a fifth cross member 150, and a rear cross member 160 are placed across and fastened to the rear rocker members 146 and 147 from the front side to the rear side, and form a tolerant structure against the impact from the lateral direction of the rear of the vehicle. In the rear rocker members 146 and 147, a sub cross member 144 is placed across the rear side of the fourth cross member 138, and a first fuel gas tank 42a is disposed between the fourth cross member 138 and the sub cross member 144. A binder 140 and a binder 141 are provided between the fourth cross member 138 and the sub cross member 144 so as to fix the first fuel gas tank 42a. A sub cross member 151 is placed across the rear part of the fifth cross member 150, and a second fuel gas tank 42b is disposed between the fifth cross member 150 and the sub cross member 151. The second fuel gas tank 42b is fixed by the binders 152 and 153 provided between the fifth cross member 150 and the sub cross member 151.

Note that, in the foregoing configuration, a notch-shaped deformation promotion part 113 is provided to the center of the front suspension member 112. When impact of the collision from the foreside of the vehicle is applied and the front suspension member 112 comes in contact with the converter assembly 250, the deformation promotion part 113 easily deforms and bends and absorbs the energy. Thus, it is thereby possible to inhibit the converter assembly 250 from moving backward any farther.

Figure 4:
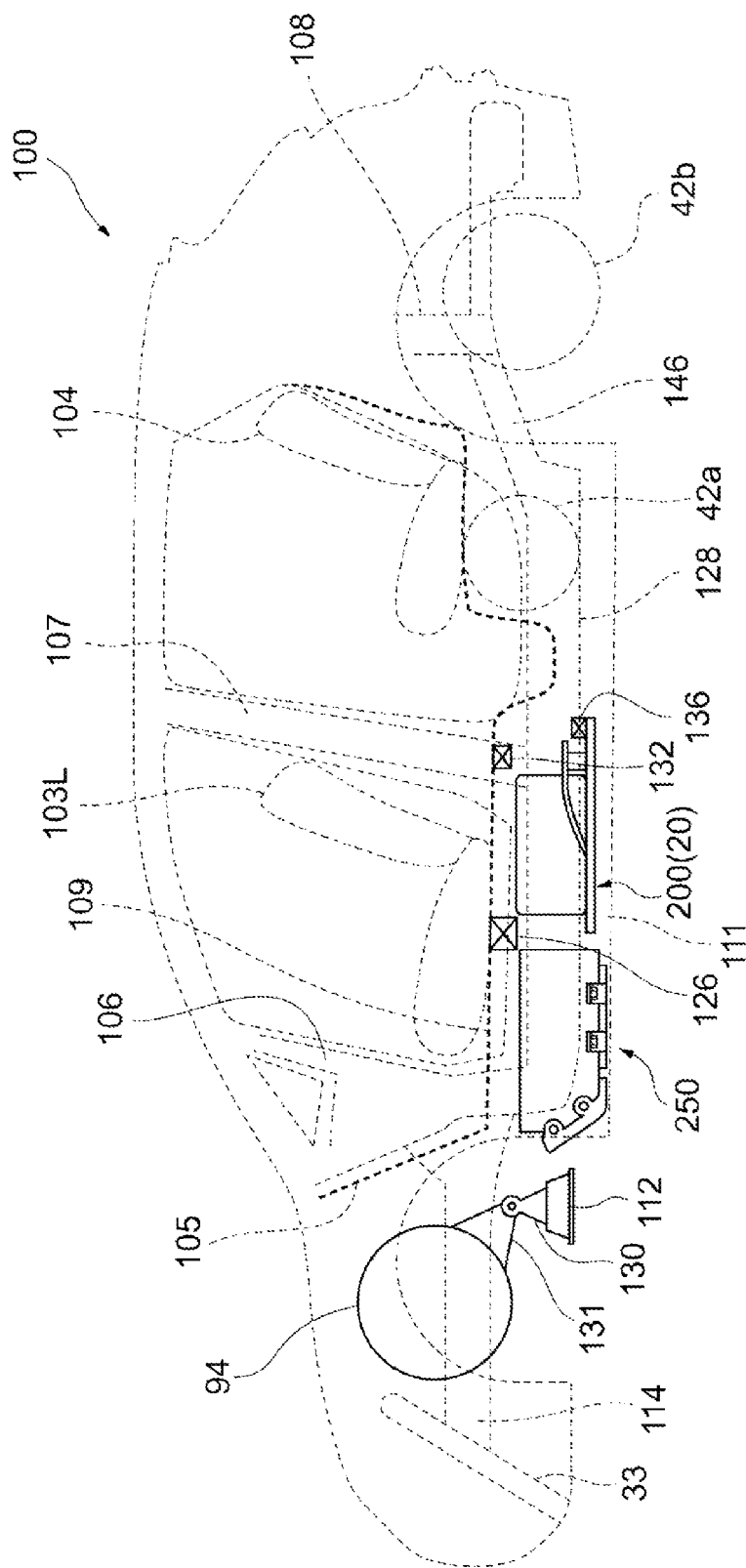
FIG. 4 is a vehicle side view explaining the arrangement of the fuel cell system in Embodiment 1.

FIG. 4 shows a vehicle side view including the arrangement of the converter assembly 250 in Embodiment 1.

As shown in FIG. 4, the vehicle drive motor 94 is fastened to a motor mount 130 provided to the front suspension member 112 via a mounting rubber 131. When impact of the collision is applied from the foreside of the vehicle, the vehicle drive motor 94 moves backward, and the front suspension member 112 also moves backward. Nevertheless, since the converter assembly 250 comprising the configuration described later as a related device of this invention, it is configured so that it can protect the fuel cell assembly 200 from a crash impact. As explained above with reference to FIG. 2, the converter assembly 250 and the fuel cell assembly 200 are disposed within the tunnel part 109 provided to the dashboard 105 of the center of the vehicle. A front pillar 106 is erected from the foreside of the side rocker member 128 (129), and a center pillar 107 is erected from the center thereof. A rear pillar 108 is erected from the center of the rear rocker member 146. As explained above with reference to FIG. 3, the side rocker members 128 and 129 configure a framework structure of surrounding the converter assembly 250 and the fuel cell assembly 200 based on the first cross member 126, the second cross member 132, and the third cross member 136.

Note that, in the foregoing configuration, the respective frames, members, and pillars all comprise a structure in which relief is provided to a plate, or a structure combining a plurality of such plates. As a result of adopting this kind of structure, high mechanical strength can be provided with light weight.

(Structure of Fuel Cell Assembly 200 and Converter Assembly 250)

Figure 5:
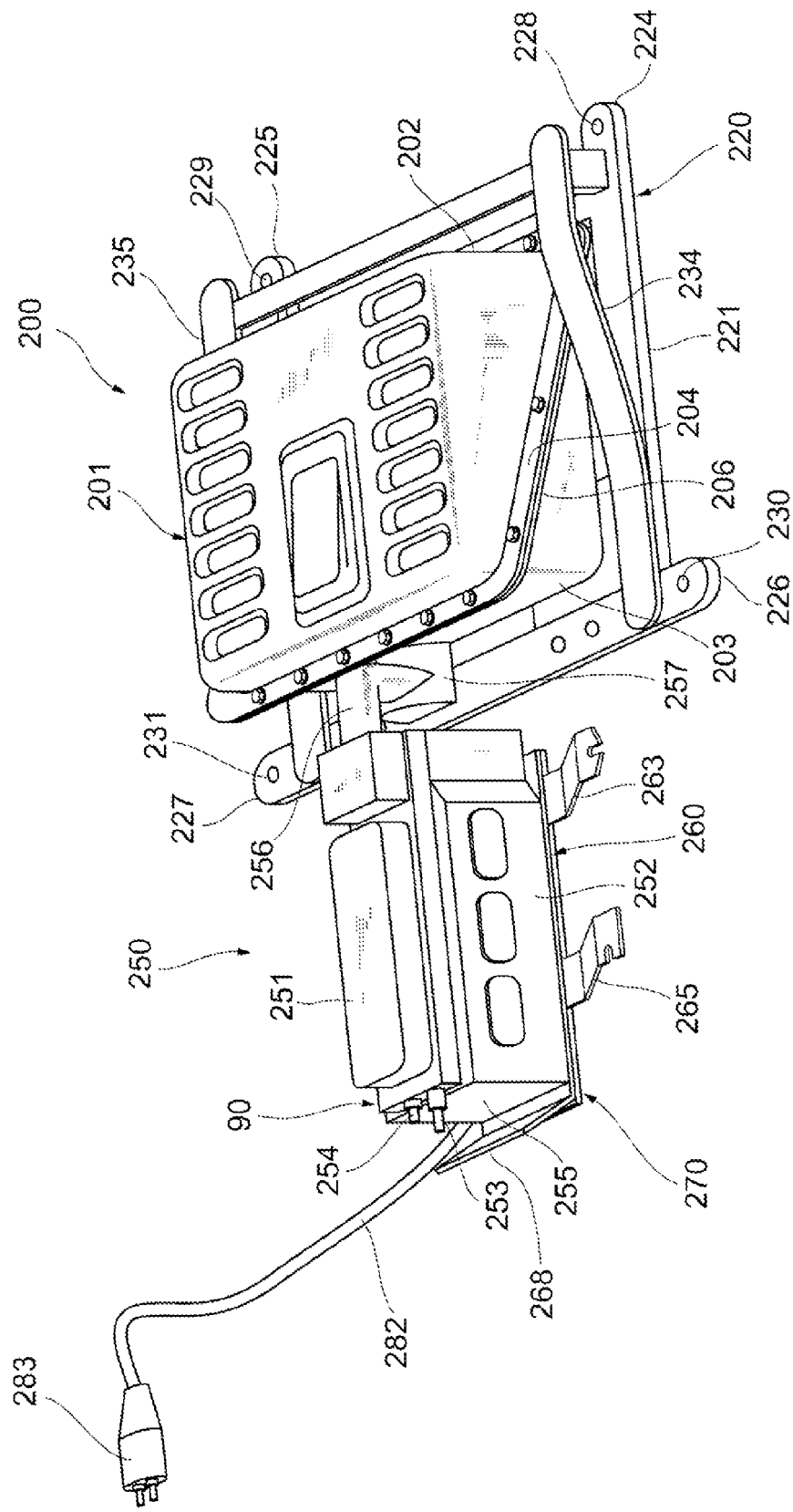
FIG. 5 is a perspective view of the fuel cell assembly and the converter assembly in Embodiment 1.

The structure of the fuel cell assembly 200 and the converter assembly 250 is now explained in detail. FIG. 5 shows a perspective view of the fuel cell assembly 200 and the converter assembly 250 in Embodiment 1.

(Fuel Cell Assembly 200)

As shown in FIG. 5, the fuel cell assembly 200 is configured by the fuel cell unit 201 being arranged in the protective structure 220.

As shown in FIG. 5, the fuel cell unit 201 is configured to house the fuel cell 20 based on an upper housing 202 and a lower housing 203. The fuel cell unit 201 is configured as a result of interposing the fuel cell 20 internally and aligning and fastening the upper flange 204 of the upper housing 202 and the lower flange 206 of the lower housing 203. A terminal socket 219 as shown in FIG. 9 is provided to the vehicle front side of the fuel cell unit 201.

Here, as shown in FIG. 5, the upper flange 204 and the lower flange 206 are sloped relative to the bottom surface or the top surface of the fuel cell unit 201 on the side surface. In other words, the flanges are formed so as to cut across the side surface of the fuel cell unit 201 diagonally. Generally speaking, the mechanical strength increases at the portion where the flanges are formed. Thus, the fuel cell unit 201 is configured to withstand the impact regardless of the height of the crash impact that is applied to the side surface where the upper flange 204 and the lower flange 206 are formed diagonally.

As shown in FIG. 5, the protection structure 220 is formed in a size that is one size larger than the bottom surface of the fuel cell unit 201 so as to surround the fuel cell unit 201. A mounting eye not shown for fastening the fuel cell unit 201 is provided to the inner corners formed by four side members configuring the protection structure 220. A panel not shown is mounted on the back side of the mounting eye. The frame structure 221 is provided with sloping frames 234 and 235. Fixing parts 226 and 227 are provided to the corner of the vehicle front side of the frame structure 221, and fastening holes 230 and 231 are formed therein. The fixing parts 226 and 227 of the vehicle front side are respectively fastened to the front frames 114 and 115. Specifically, the fastening holes 230 and 231 provided to the fixing parts 226 and 227 and the fastening holes provided to the front frames 114 and 115 are fastened with fastening members (bolts and nuts, or the like). Fixing parts 224 and 225 are provided to the end of the vehicle rear side of the sloping frames 234 and 235, and fastening holes 228 and 229 are formed therein. The fixing parts 224 and 225 are fastened to the third cross member 136. Specifically, the fastening holes 228 and 229 provided to the fixing parts 224 and 225 and the fastening holes provided to the third cross member 136 are fastened with fastening members.

As shown in FIG. 5, the protection structure 220 includes sloping frames 234 and 235 provided at a slope relative to the horizontal plane at a position that is opposite to the two side surfaces of the fuel cell unit 201. Thus, the fuel cell unit 201 is configured to withstand the impact regardless of the height of the crash impact that is applied to the sloping frames 234 and 235.

Moreover, as shown in FIG. 5, with the protection structure 220, the fuel cell unit 201 is arranged so that the sloping direction of the sloping frames 234 and 235 is oppositely-oriented in relation to the sloping direction of the upper flange 204 and the lower flange 206 of the fuel cell unit 201. For example, in FIG. 5, the sloping frames 234 and 235 of the protection structure 220 are inclined so as to become higher from the front part of the vehicle toward the rear part of the vehicle. Thus, the fuel cell unit 201 is mounted on the protection structure 220 in a direction of becoming lower from the vehicle anterior to the vehicle posterior of the upper flange 204 and the lower flange 206. Since the flanges of the fuel cell unit 201 and the sloping frames 234 and 235 of the protection structure 220 are combined in the foregoing direction, the mechanical strength can be further increased. This is because, when the fuel cell assembly 200 is viewed from the side surface direction, the flanges of the fuel cell unit 201 and the sloping frames of the protection structure 220 configure a crossover structure.

(Converter Assembly 250)

Figure 6:
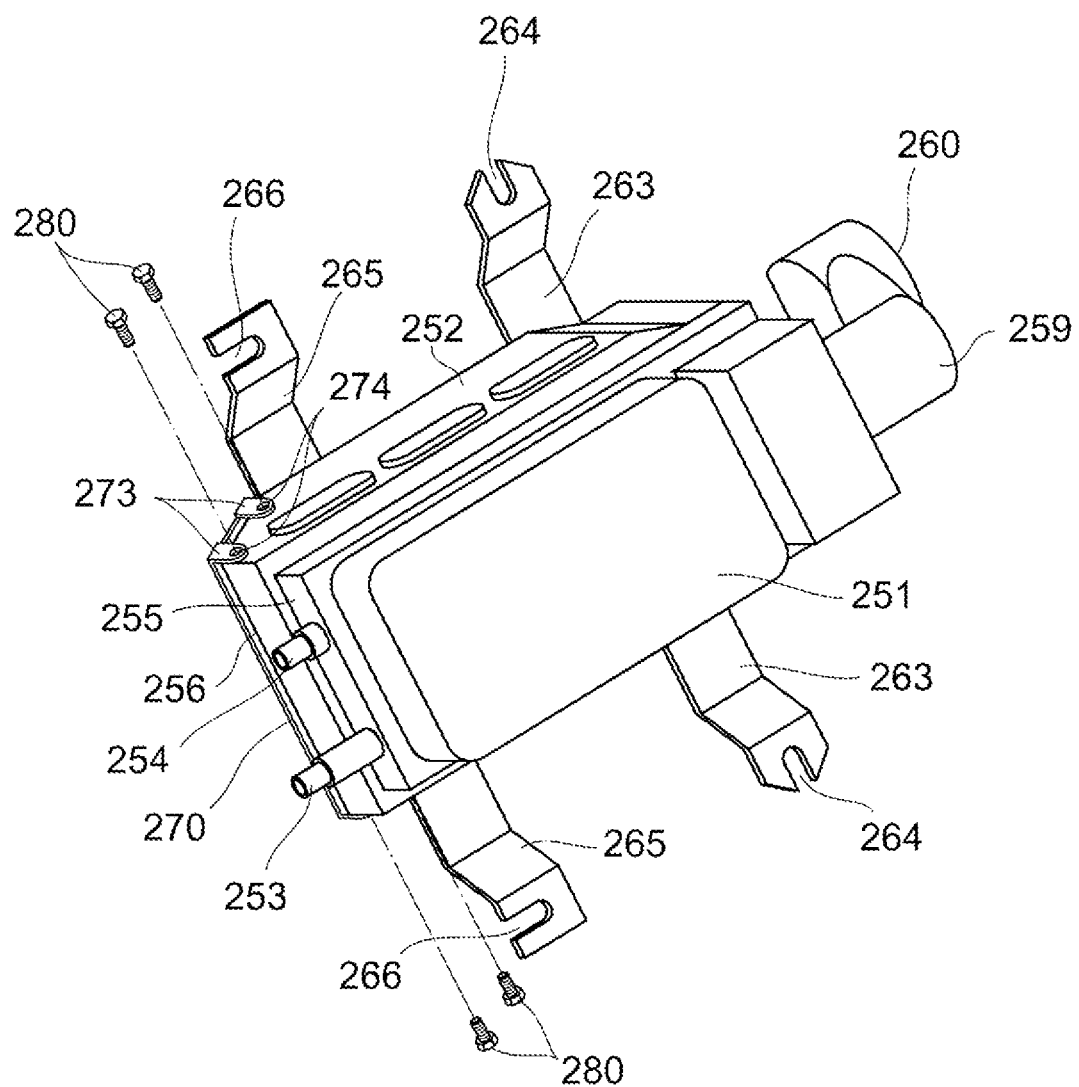
FIG. 6 is a perspective view from the upper side of the converter assembly in Embodiment 1.
Figure 7:
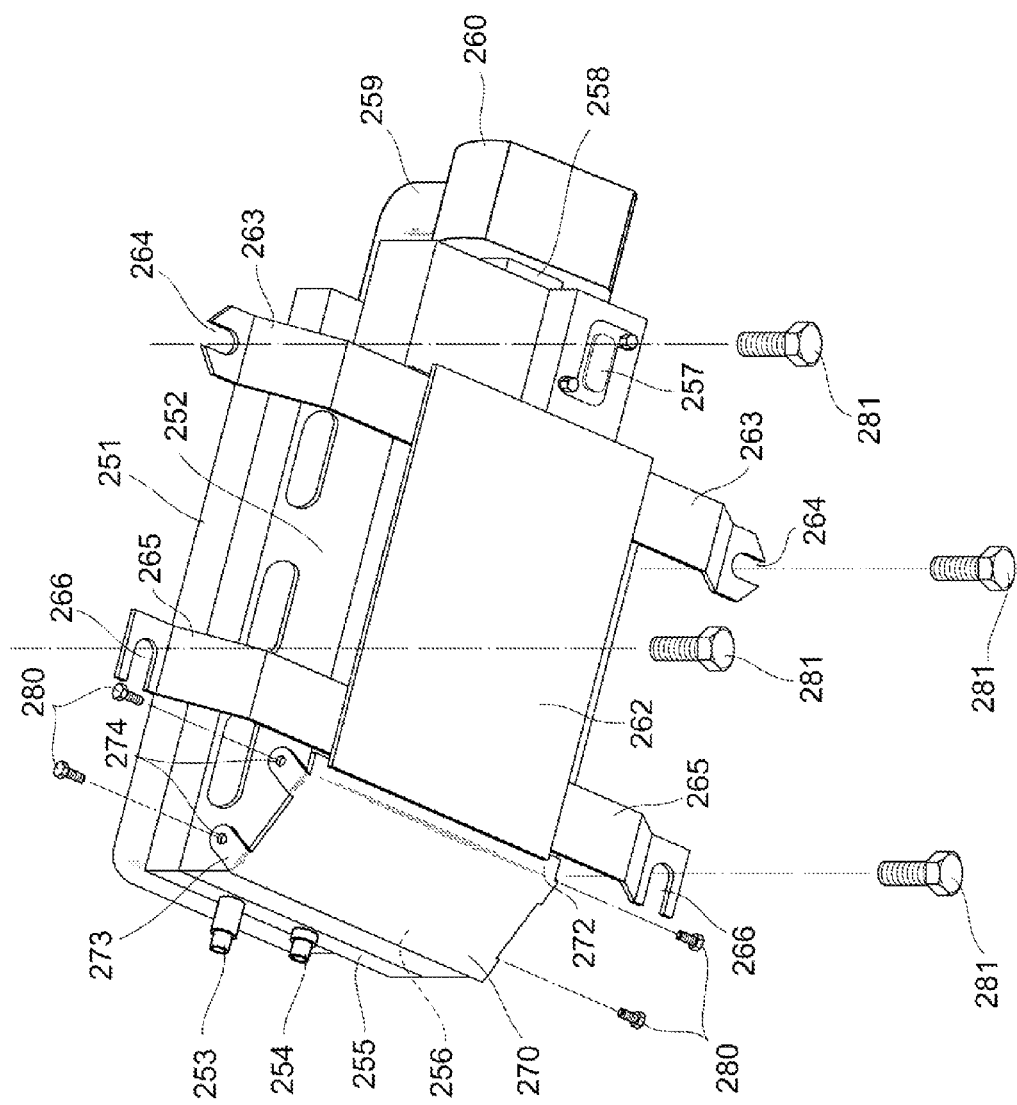
FIG. 7 is a perspective view from the lower side of the converter assembly in Embodiment 1.

The structure of the converter assembly 250 is now explained in detail with reference to FIG. 5 to FIG. 7. FIG. 6 is a perspective view of the converter assembly 250 from the upper side. FIG. 7 is a perspective view of the converter assembly 250 from the lower side.

As shown in FIG. 5, the converter assembly 250 is arranged on the vehicle front side of the fuel cell assembly 200. Based on the foregoing arrangement, the converter assembly 250 will be subject to the crash impact before the fuel cell assembly 200 in relation to the crash impact from the vehicle anterior. Consequently, it is possible to effectively prevent the crash impact from adversely affecting the fuel cell 20 based on the structure of the present invention described later.

As shown in FIG. 5 to FIG. 7, the converter assembly 250 is configured by mounting a bottom surface protection plate 262 and a front surface protection plate 270 on the FC converter 90. The bottom surface protection plate 262 is provided to the bottom surface of the FC converter 90. The front surface protection plate 270 is mounted so as to cover the inclined part 256 formed at a part of the front surface 255 of the FC converter 90.

The FC converter 90 is configured by the upper housing 251 and the lower housing 252 being bonded. A coolant inlet 253 and a coolant outlet 254 are provided to the front surface 255 of the FC converter 90. A relay part 257 is provided to the rear part of the FC converter 90, and houses the relay 97 shown in FIG. 1. The relay 97 electrically disconnects the secondary-side terminal in the FC converter 90 and the input terminal of the inverter 93 and the inverter 95, and the secondary-side terminal of the battery converter 98 and the electrical system when a crash impact of a certain level of higher is applied.

Moreover, a power cable 259 is connected to the rear part of the converter assembly 250, and the terminal connector 260 provided to the tip of the power cable 259 is electrically connected to the fuel cell unit 201. As shown in FIG. 5, a power cord 282 is additionally connected to the power cable 259 electrically in series at the rear part of the converter assembly 250. The power cord 282 is connected to the inverter 93 shown in FIG. 1 by the power plug 283 provided at the tip thereof.

In addition, a protruding part 258 is provided to one corresponding to the terminal connector 260 at the rear part of the converter assembly 250. The protruding part 258 pertains to the third feature of the present invention, and functions as a short-circuit protection means which causes the output terminal of the fuel cell 20 to short circuit. The protruding part 258 is provided at a position where it will come in contact with the electrode terminal of the terminal socket 219 of the fuel cell unit 201 based on the movement of the FC converter 90 that is anticipated when the vehicle 100 collides.

The bottom surface protection plate 262 is a protection means for protecting the FC converter 90 from a crash impact from the lower side of the vehicle; that is, from the bottom surface. A fixing part 263 is provided to the vehicle rear side of the bottom surface protection plate 262, and a fixing part 265 is provided to the vehicle front side of the bottom surface protection plate 262. The fixing parts 263 and 265 are members that retain the bottom surface protection plate 262 at four diagonal points, and comprise a bent structure as shown in the diagram. The fixing parts 263 and 265 of the bottom surface protection plate 262 pertain to the second feature of the present invention, and are configured so that the fixing part 265 provided to the front side is unfastened with weaker force than the fixing part 263 provided to the rear side.

Specifically, as shown in FIG. 6 and FIG. 7, the fixing part 263 on the vehicle rear side includes, on its tip, a fastening groove 264 which opens toward the vehicle width direction. Meanwhile, the fixing part 265 on the vehicle front side includes, on its tip, a fastening groove 266 which opens toward the vehicle anterior. The pair of fixing parts 263 and the pair of fixing parts 265 are respectively fastened to the fastening holes of the sub frames 118 and 119 by inserting a bolt 281 through the fastening grooves 264 and 266.

Here, while the fastening groove 266 of the fixing part 265 of the vehicle front side is opened toward the vehicle forward direction, the fastening groove 264 of the fixing part 263 of the vehicle rear side is opened toward the vehicle width direction. Thus, if an impact is applied to the converter assembly 250 from the vehicle front side, the fastening groove 266 of the fixing part 265 of the vehicle front side is more easily unfastened from the bolt 281 than the fastening groove 264 of the fixing part 263 of the vehicle rear side.

The front surface protection plate 270 is a protection means that is shaped so as to cover the inclined part 256 provided to the lower side of a part of front surface 255 of the FC converter 90. The inclined part 256 pertains to the first feature of the present invention, and is formed in front of the lower housing 252 of the FC converter 90. The inclined part 256 is a sloping surface that is formed so that the normal of its surface faces downward toward the anterior, and is a protection means that functions to change the moving direction of the member that comes in contact during the impact from the front.

As shown in FIG. 6 and FIG. 7, a front surface protection plate 270 is mounted so as to cover the inclined part 256. The front surface protection plate 270 is provided with a bend part 272 which surrounds and protects the bottom surface of the FC converter 90. Four fixing parts 273 are provided to the front surface protection plate 270, and a fastening hole 274 is provided to the respective fixing parts 273. As a result of inserting the bolt 280 as a fastening member through the fastening hole 274 of the fixing part 273 and fastening it to the fastening hole on the side surface of the FC converter 90, the front surface protection plate 270 is mounted on the inclined part 256 of the FC converter 90.

Here, the inclined part 256 is sloped so that its angle relative to the horizontal plane is an angle that is smaller than 90 degrees. Thus, when a structure member such as the front suspension member 112 moves due to the crash impact from the vehicle anterior and comes in contact with the front surface protection plate 270 provided to the inclined part 256, its moving direction is changed to a downward direction. For example, a member such as the front suspension member 112 that was subject to the crash impact before the FC converter 90 moves to the rear side due to the crash impact, and collides with the inclined part 256; directly with the front surface protection plate 270. Here, since the inclined part 256 is a sloped surface facing downward, the moving direction of the member that came in contact is changed.

Moreover, the converter assembly 250 is provided with a shock absorbing member not shown at the rear part that will face the fuel cell unit 201. As a result of providing a shock absorbing member as described above, even if the converter assembly 250 comes in contact with the fuel cell unit 201 due to the crash impact, since the shock absorbing member alleviates the impact during such contact, it is possible to effectively inhibit the fuel cell 20 from becoming damaged.

Note that the foregoing bottom surface protection plate 262 and front surface protection plate 270 can be configured of a metal material with a given rigidity; for example, aluminum, SUS, iron and the like.

(Functions of Present Invention)

The structure of this embodiment and the characteristics functions that are yielded by such structure are now explained with reference to FIG. 8 and FIG. 9.

(Function of First Feature (Inclined Part 256))

The first feature of the present invention is that an inclined part 256 is provided to the vehicle front side of the FC converter 90 as a related device that is arranged adjacent to the fuel cell unit 201. According to this structure, when a crash impact is applied to the vehicle 100 from the vehicle front side, the moving direction of the FC converter 90 is changed to a direction that is not parallel to the forward direction; that is, to a lower direction. This is now explained with reference to FIG. 8.

Figure 8A:
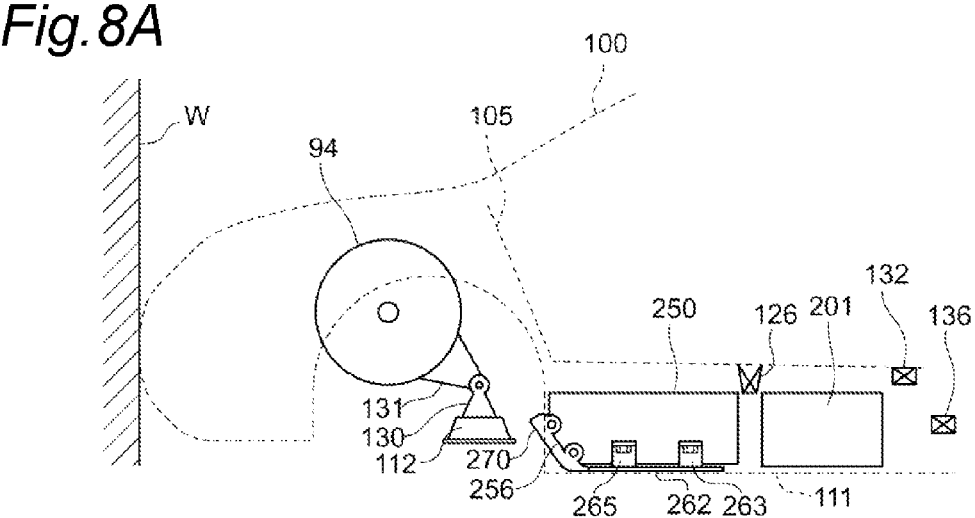
FIG. 8A is a diagram during the collision of the front surface.

FIG. 8A shows a state where the vehicle 100 collided with a wall W. As described above, the fuel cell unit 201, the converter assembly 250, and the front suspension member 112 are arranged in order along the forward direction of the vehicle 100. At this point in time, the vehicle drive motor 94 has not yet been subject to a crash impact.

Figure 8B:
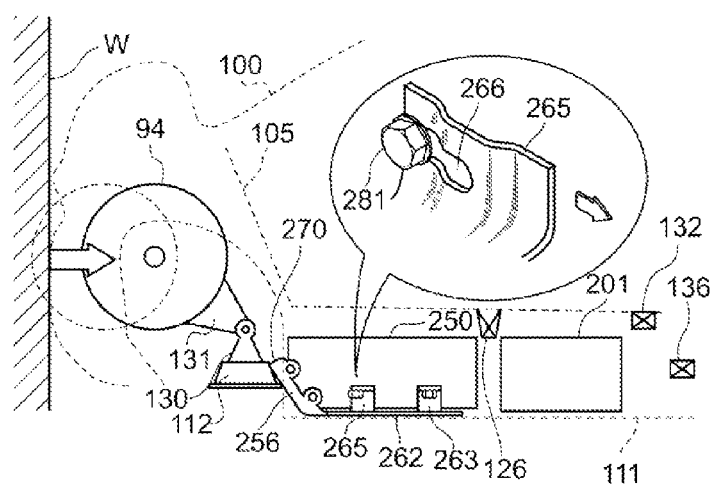
FIG. 8B is a diagram when the object reaches the position of the converter assembly.

FIG. 8B shows a state where there front side portion of the vehicle 100 is crushed and the crash impact has reached the vehicle drive motor 94. Since the vehicle drive motor 94 has a given weight, it moves backward due to inertia upon receiving a crash impact from the vehicle anterior. The vehicle drive motor 94 is mounted on the front suspension member 112 via a mounting rubber 131. Thus, the front suspension member 112 moves backward by being dragged by the vehicle drive motor 94 or upon receiving the crash impact on its own. The moving direction of the front suspension member 112 is a direction that is opposite to the advancing direction of the vehicle. Thus, when the front suspension member 112 moves a prescribed distance, it reaches the converter assembly 250. The front suspension member 112 is positioned and arranged to come in contact with the inclined part 256 of the converter assembly 250 when it advances from its position in a direction that is opposite to the advancing direction of the vehicle. Thus, when the front suspension member 112 is subject to a crash impact and moves backward, it comes in contact with a part of the inclined part 256 of the converter assembly 250. The front suspension member 112 directly collides into the front surface protection plate 270. Since the front surface protection plate 270 is directly subject to the crash impact, it is possible to prevent the FC converter 90 from being directly subject to the crash impact and becoming damaged.

Figure 8C:
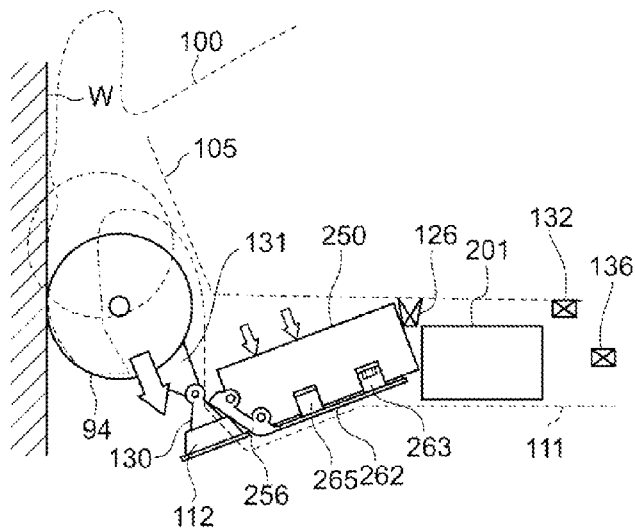
FIG. 8C is a diagram when the moving direction of the converter assembly changes pursuant to the change in the moving direction of the object.

FIG. 8C shows a state after the moving direction of the members including the vehicle drive motor 94 and the front suspension member 112 is changed. The normal of the front surface protection plate 270 is facing downward. Thus, when the front suspension member 112 comes in contact with the front surface protection plate 270, as shown in FIG. 8C, its moving direction faces downward. When the moving direction of the front suspension member 112 is changed to face downward, the moving direction of the vehicle drive motor 94 is dragged and also changed to face downward. When a heavy related device including the vehicle drive motor 94 moves downward, the floor panel 111 deforms in a manner of bending downward. Subsequently, based on the second feature of the present invention described later, the converter assembly 250 tilts forward as though bowing its head. Specifically, it moves in a direction shown with the outlined arrow of FIG. 8C.

Even if an impact is applied to the converter assembly 250 which causes it to move in the reverse direction, since the first cross member 126 comes in contact with the upper rear end of the FC converter 90, the FC converter 90 is prohibited from moving further in the reverse direction. Thus, it is possible to prevent the FC converter 90 from reaching the fuel cell unit 201 and damaging the fuel cell unit 201. The crash impact is absorbed based on the movement of a related device such as the converter assembly 250, and the process of deformation of related members such as the front suspension member 112, the sub frames 118 and 119, and the floor panel 111.

Note that, when the moving direction of the front suspension member 112 is changed, the vehicle drive motor 94 is dragged thereby and its moving direction is also changed downward. In addition, when the crash impact is strong, it also changes its moving direction as follows. When the vehicle drive motor 94 moves to the vehicle posterior, as shown in FIG. 8B, a dashboard 105 exists at such location. The dashboard 105 has a sloped front surface as with the inclined part 256. Specifically, the normal of the front surface of the dashboard 105 is facing downward. Thus, the vehicle drive motor 94 moves until it comes in contact with the dashboard 105 due to the strong crash impact, and the moving direction of the vehicle drive motor 94 that collided with the front surface of the dashboard 105 is faced downward. Thus, the vehicle drive motor 94 also changes its moving direction on its own.

As described above, according to the first feature of the present invention, since the movement of the converter assembly 250 in the reverse direction is changed to a rotating motion, it is possible to effectively inhibit the converter assembly 250 from reaching and damaging the fuel cell unit 201.

(Function of Second Feature (Inclined Part 256))

The second feature of the fuel cell system of the present invention is configured so that the fixing part 265 provided to the front side of the bottom surface protection plate 262 is unfastened with weaker force than the fixing part 263 provided to the rear side in the converter assembly 250 as the related device.

As shown in FIG. 8B, when the front suspension member 112 collides with the front surface protection plate 270 of the converter assembly 250, the FC converter 90 is pushed in the vehicle reverse direction. As explained with reference to FIG. 6 and FIG. 7, the bottom surface protection plate 262 of the FC converter 90 is fastened to the sub frames 118 and 119 by the fixing parts 263 and 265 using a bolt 281. Here, since the direction of stress applied to the fixing part 263 by the bolt 281 that is inserted through the fastening groove 264 of the fixing part 263 on the rear side is the same direction as the forward direction, it is different from the width direction to which the fastening groove 264 is opened. Thus, even if rearward force is applied, the bolt 281 will not become unfastened from the fastening groove 264, and the fastening of the fixing part 263 will not be released easily.

Meanwhile, the fastening groove 266 of the fixing part 265 on the front side is disposed so that its opening direction faces the vehicle forward direction. When rearward force is applied, the direction of stress applied to the fixing part 265 by the bolt 281 that is inserted through the fastening groove 266 will be the same direction as the forward direction. Thus, if a crash impact is applied from the front side, the bolt 281 will become unfastened from the fastening groove 266, and the fastening of the fixing part 265 will be released easily.

When the fastening of the fixing part 265 on the front side is released while the fastening of the fixing part 263 on the rear side is not released, the converter assembly 250 tends to drop downward as though bowing its head due to the weight on the front side. Even if the converter assembly 250 is subject to an impact that causes it to move in the reverse direction and the converter assembly 250 moves backward, since the first cross member 126 comes in contact with the upper rear end of the FC converter 90, the FC converter 90 is prohibited from moving further in the reverse direction. Thus, the converter assembly 250 rotates around the vicinity of the first cross member 126 and its front part falls downward in a sweeping motion. Here, since the converter assembly 250 will not move in the reverse direction, it is possible to prevent the fuel cell unit 201 from becoming damaged.

As described above, according to the second feature of the present invention, since the configuration is such that the fastening of the fixing part 265 on the front side is unfastened easier than the fastening of the fixing part 263 on the rear side, the moving direction of the converter assembly 250 that was subject to an impact can be changed easily. It is possible to prevent the fuel cell unit 201 from becoming damaged by changing the moving direction of the converter assembly 250.

(Function of Third Feature (Protruding Part 258))

The third feature of the fuel cell system of the present invention relates to a protruding part 258 provided to the rear part of the FC converter 90 as the related device; that is, on the fuel cell unit 201 side. The protruding part 258 is unique in that it is provided at a position of coming in contact with the electrode terminal of the fuel cell unit 201 based on the movement of the converter assembly 250 that is anticipated when the vehicle collides. This is now explained with reference to FIG. 9.

Figure 9A:
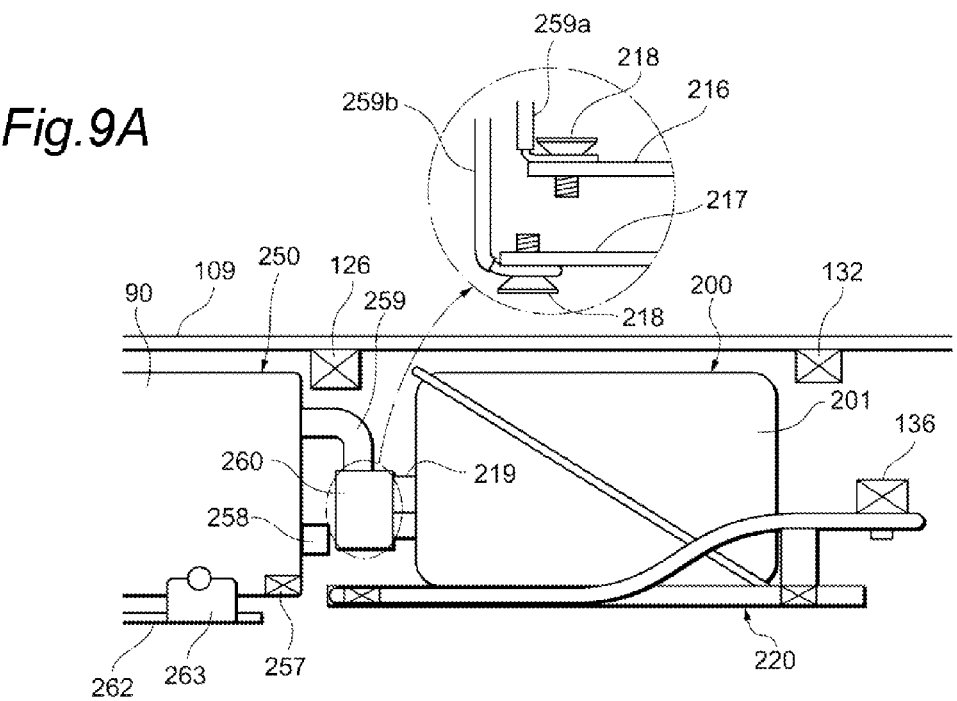
FIG. 9A is the arrangement explanatory diagram before collision.

FIG. 9A is a side view showing the connection structure of the converter assembly 250 and the fuel cell unit 201. As shown in FIG. 9A, a power cable 259, to which a terminal connector 260 is provided at its tip, is provided to the rear part of the FC converter 90. A terminal socket 219 is provided to the side surface of the front side of the fuel cell unit 201. The terminal socket 219 is provided with a positive electrode terminal 216 and a negative electrode terminal 217 to become the secondary-side terminal of the fuel cell 20 shown in FIG. 1. A tip part of the power wire 259a pertaining to the positive electrode of the power cable 259 is fastened by a terminal screw 218 to the positive electrode terminal 216. A tip part of the power wire 259b pertaining to the negative electrode of the power cable 259 is fastened by a terminal screw 218 to the negative electrode terminal 217.

As shown in FIG. 9A, the converter assembly 250 and the fuel cell unit 201 are positioned and arranged so that the protruding part 258 of the rear part of the FC converter 90 faces the slight underside of the terminal socket 219 of the fuel cell unit 201. Specifically, when the converter assembly 250 moves backward while rotating due to the crash impact from the vehicle anterior, the positive electrode terminal 216 and the negative electrode terminal 217 are arranged in an overlapping manner along the locus on which the protruding part 258 will move. In other words, the protruding part 258 is arranged in a positional relationship of causing the negative electrode terminal 217 and the positive electrode terminal 216 to short circuit during a collision from the vehicle anterior.

Figure 9B:
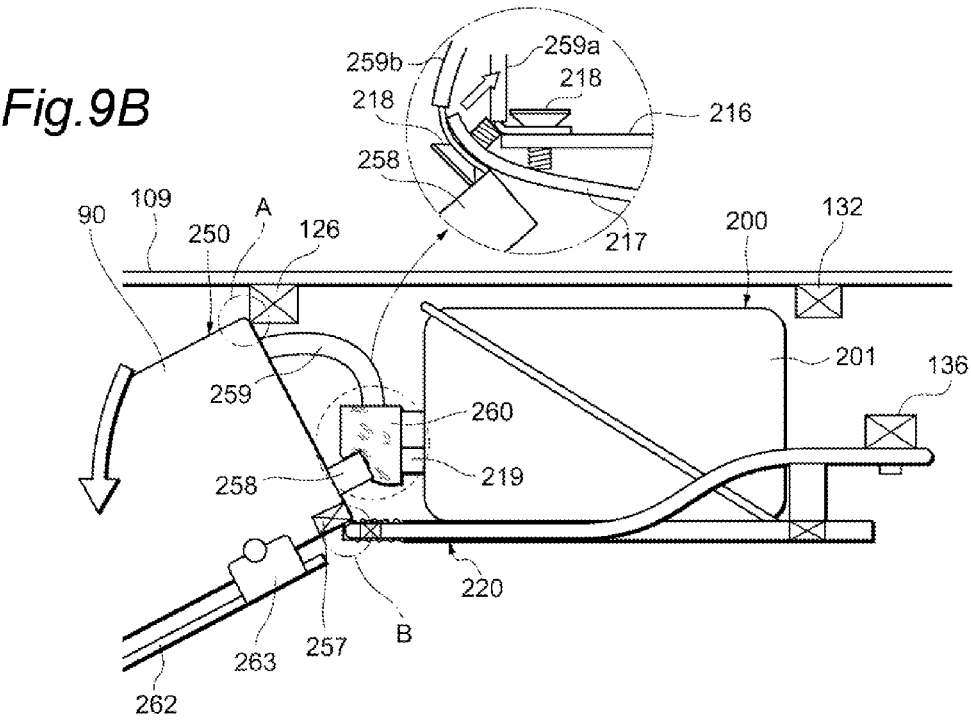
FIG. 9B is the arrangement explanatory diagram when the moving direction of the converter assembly is changed.

FIG. 9B shows the movement of the protruding part 258 when a crash impact is applied from the vehicle anterior. When a crash impact is applied from the vehicle anterior, based on the foregoing first feature and second feature, as shown in FIG. 8C, the converter assembly 250 will move backward while rotating. Specifically, when the converter assembly 250 slightly moves backward, as shown in FIG. 9B, the rear part of the FC converter 90 comes in contact with the first cross member 126 at position A. The converter assembly 250 rotates around the position A. The protruding part 258 provided to the rear part of the FC converter 90 moves toward the terminal socket 219. Here, since the movement locus of the protruding part 258 overlaps with the negative electrode terminal 217 and the positive electrode terminal 216, as shown in FIG. 9B, the negative electrode terminal 217 is bent by the protruding part 258 and comes in contact with the positive electrode terminal 216. When the negative electrode terminal 217 and the positive electrode terminal 216 come in contact, the fuel cell 20 shown in FIG. 1 will be electrically short circuited. When the fuel cell 20 is electrically short circuited, the power generation function will stop even if it power is being generated, and the electrical charge retained internally will be discharged. Thus, even if fuel gas leaks from the fuel cell system due to a crash impact, it is possible to prevent a fire caused by the discharge from an electrode to which a high voltage was applied.

Note that the negative electrode terminal 217 and the positive electrode terminal 216 do not need to be disposed alongside precisely on the movement locus of the protruding part 258. When the protruding part 258 moves due to a crash impact, the structure will suffice so as long as one electrode terminal is subject to force and deformed and comes in contact with the other electrode terminal. It is also possible to configure the protruding part 258 itself as the conductor and, when the crash impact is applied, cause it to short circuit the fuel cell 20 by being inserted between the electrode terminals.

Moreover, as described above, the converter assembly 250 rotates around the position A of coming in contact with the first cross member 126. Thus, not only does the first cross member 126 simply prevent the converter assembly 250 from moving backward, it also plays the role of controlling the rotational locus of the converter assembly 250. Based on this role, the features of the third feature and the fourth feature explained subsequently can be functioned effectively.

(Function of Fourth Feature (Relay Part 257))

The fourth feature of the fuel cell system of the present invention is in that a relay part 257 (short circuit part) configured to be capable of short circuiting the power source of the FC converter 90 as a related device, when force of a certain level or higher is applied, is provided to the rear part of the FC converter 90.

As shown in FIG. 9B, the relay part 257 provided to the rear part of the FC converter 90 is positioned and arranged so as to face the slight underside of the front side frame of the protection structure 220 in which the fuel cell unit 201 is to be arranged. Specifically, when the converter assembly 250 moves backward while rotating due to a crash impact from the vehicle anterior, the relay part 257 is disposed so that it comes in contact with the front side frame of the protection structure 220 at position B. The relay part 257 is provided with the relay 97 shown in FIG. 1.

In this arrangement, when a crash impact is applied from the vehicle anterior, the converter assembly 250 moves backward until coming in contact with the first cross member 126, and rotates around the position A after such contact. Here, the relay part 257 provided to the rear part of the FC converter 90 moves toward the front side frame of the protection structure 220, and comes in contact at the position B. The relay part 257 is broken when force of a certain level or higher is applied, and the relay 97 electrically disconnects the secondary-side terminal in the FC converter 90 from the input terminal of the inverter 93 and the inverter 95, and the secondary-side terminal of the battery converter 98 and the electrical system. Thus, even if fuel gas leaks from the fuel cell system due to a crash impact, since the electrical system that was connected to the secondary-side terminal of the FC converter 90 is disconnected, it is possible to prevent a fire caused by a discharge.

(Advantages of this Embodiment)

(1) According to the first feature in this embodiment, an inclined part 256 is provided to the front side of the converter assembly 250. According to the foregoing configuration, when a crash impact is applied from the vehicle front side, the moving direction of the front suspension member 112 and the vehicle drive motor 94 which are subject to the crash impact first can be changed to a downward direction, and it is thereby possible to prevent the fuel cell unit 201 from becoming damaged.

(2) According to the second feature in this embodiment, the configuration is such that, of the two fixing parts 263 and 265 for fastening the converter assembly 250, the fastening of the fixing part 265 on the front side can be released easily. Thus, when a crash impact is applied from the vehicle anterior, the fastening of the fixing part 265 on the front side is released first, and the converter assembly 250 will move backward while rotating. Thus, it is possible to prevent the converter assembly 250 from directly reaching and damaging the fuel cell unit 201.

(3) According to the third feature in this embodiment, a protruding part 258 is provided to the rear part of the FC converter 90, and the protruding part 258 faces the slight underside of the terminal socket 219 of the fuel cell unit 201. Thus, if a crash impact is applied from the vehicle anterior, the protruding part 258 short circuits the power terminal of the fuel cell unit 201. Thus, even if the fuel gas is leaked, it is possible to prevent a fire from occurring.

(4) According to the fourth feature in this embodiment, a relay part 257 (relay 97), which is configured to shut off the power source when force of a certain level or higher is applied, is provided to the rear part of the FC converter 90. Thus, if a crash impact is applied from the vehicle anterior, the relay part 257 comes in contact with the protection structure 220 of the fuel cell assembly 200 and is broken, and the relay 97 disconnects the secondary-side terminal of the FC converter 90 from the other electrical systems. Thus, even if the fuel gas is leaked, it is possible to prevent a fire from occurring.

(5) According to this embodiment, a first cross member 126 is disposed at the upper rear side of the converter assembly 250. Thus, even if a crash impact is applied from the vehicle anterior, it is possible to prevent the converter assembly 250 from moving further backward. Moreover, the moving direction of the converter assembly 250 can be reliably changed to a direction of moving backward while rotating.

(6) According to this embodiment, since a shock absorbing member is provided to the rear part of the converter assembly 250, even if the converter assembly 250 comes in contact with the fuel cell unit 201, it is possible to alleviate the impact of the contact, and effectively inhibit the fuel cell unit 201 from becoming damaged.

(7) According to this embodiment, an inclined part 256 as the structure of the first feature of the present invention was formed on the FC converter 90 as the related device. This it because the FC converter 90 is a related device with the strongest association with the fuel cell 20 as the voltage converting means for converting the output voltage of the fuel cell 20, and is a member that is provided adjacently with high certainty.

(Embodiment 2)

Embodiment 2 of the present invention relates to a modified example of the first feature of the present invention.

In foregoing Embodiment 1, a converter assembly 250 was arranged on the front side of the fuel cell assembly 200, and the first feature of the present invention; that is, the inclined part 256 was provided to the FC converter 90. In Embodiment 2, the first feature of the present invention is provided to a related device other than the FC converter 90.

Figure 10:
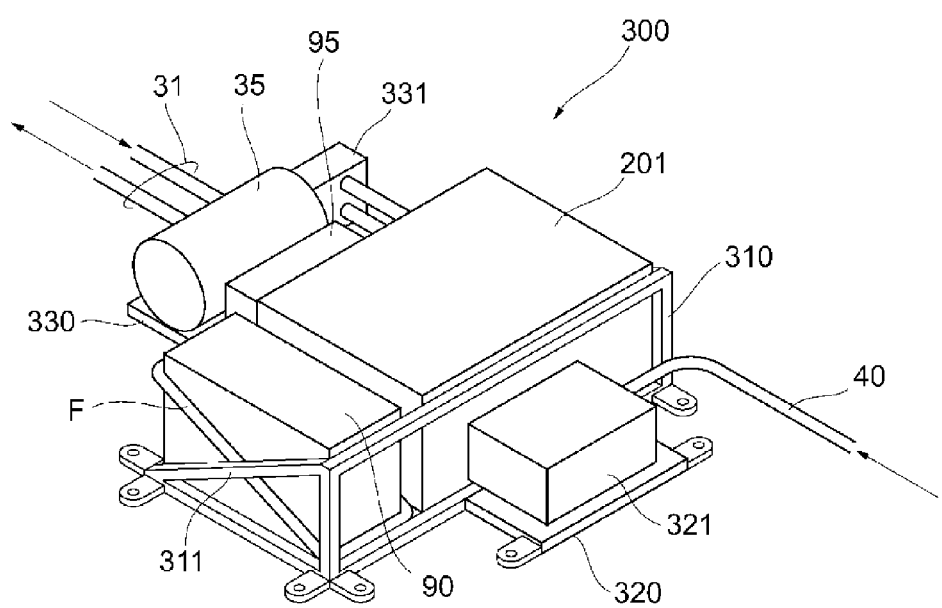
FIG. 10 is a perspective view of the fuel cell assembly in Embodiment 2.
Figure 11:
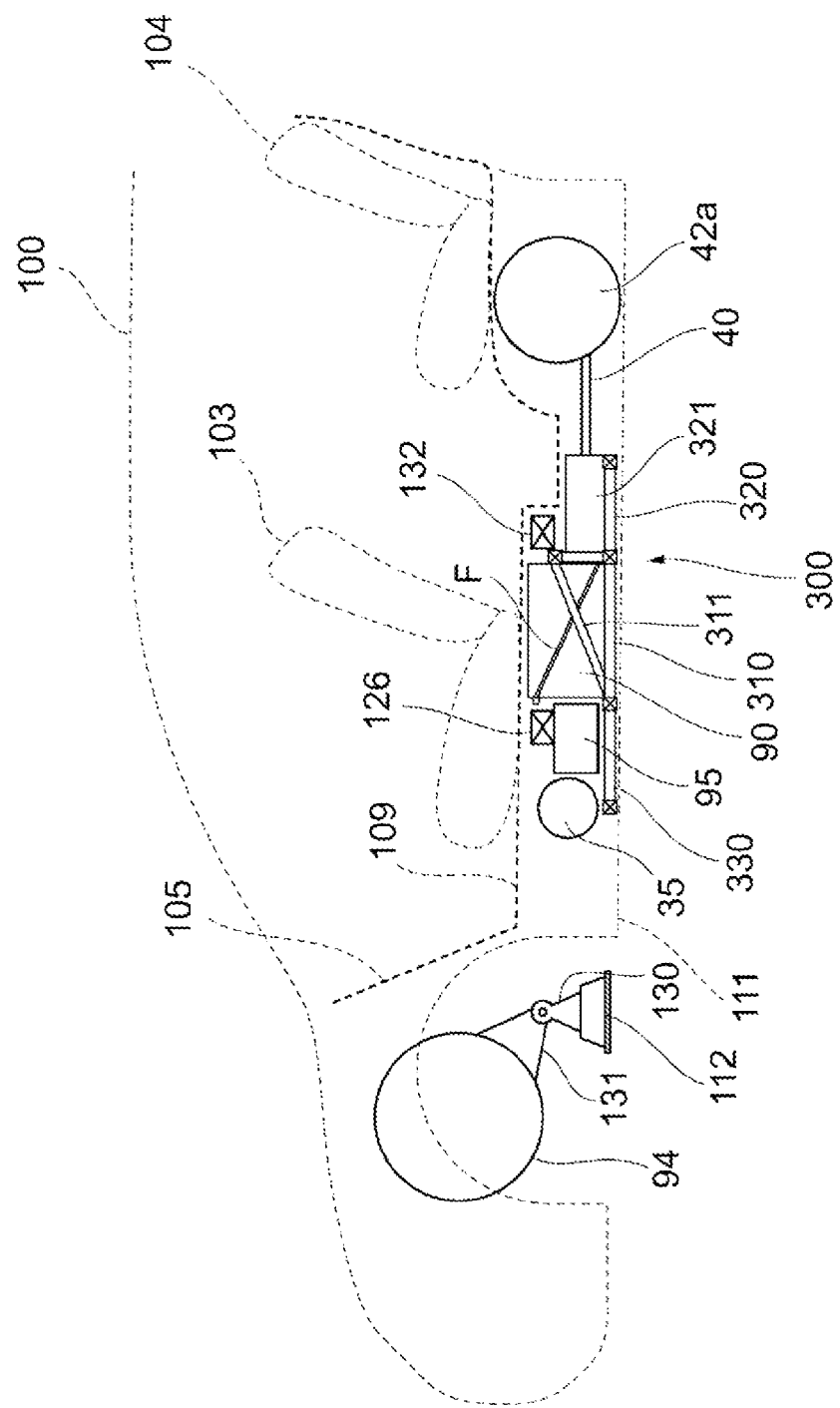
FIG. 11 is a vehicle side view explaining the arrangement of the fuel cell assembly in Embodiment 2.
Figure 12:
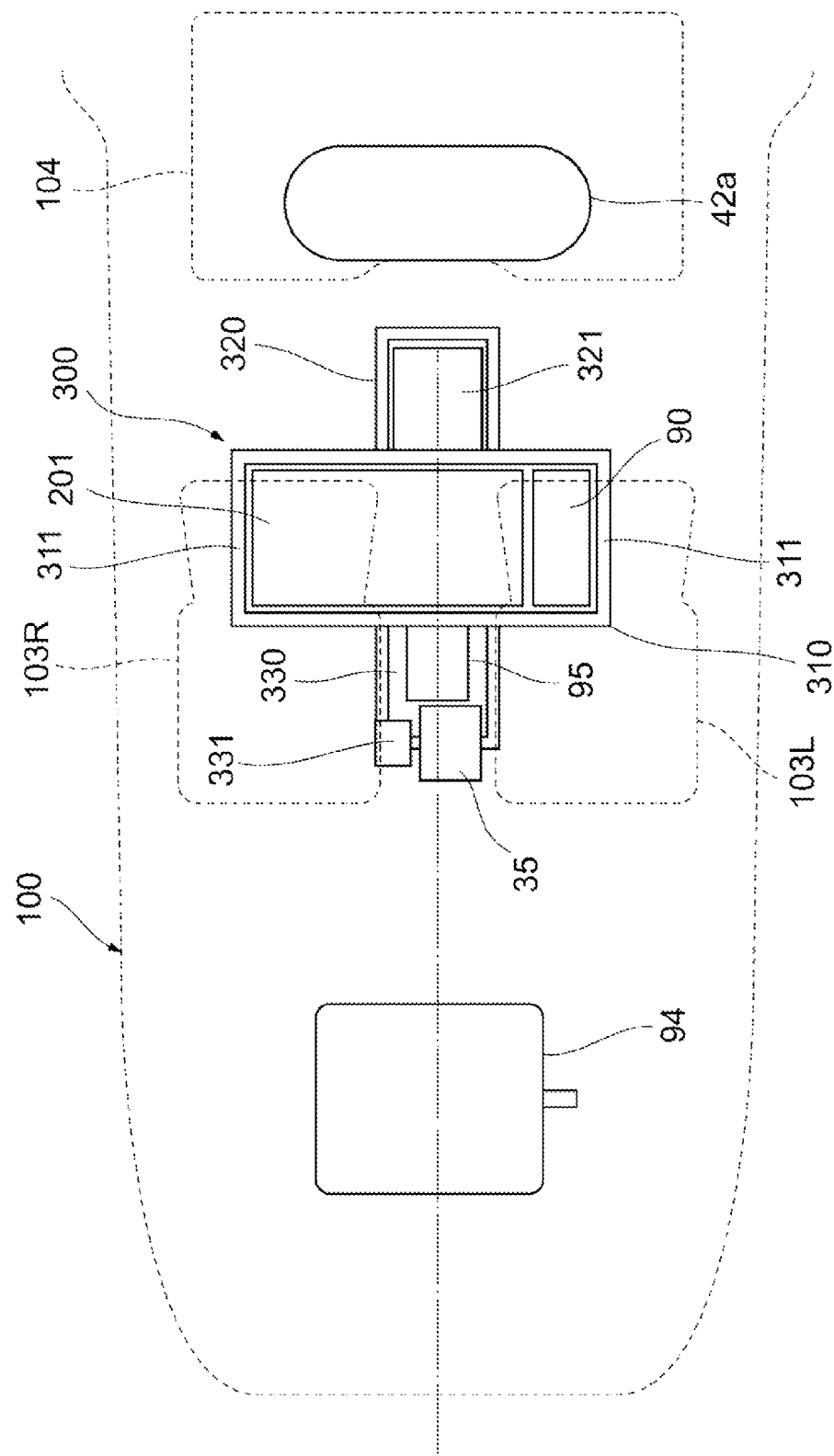
FIG. 12 is a vehicle bottom view explaining the arrangement of the fuel cell assembly in Embodiment 2.

FIG. 10 shows a perspective view of the fuel cell assembly 300 in Embodiment 2. FIG. 11 shows a vehicle side view explaining the arrangement of the fuel cell assembly 300 in Embodiment 2. FIG. 12 shows a vehicle bottom view explaining the arrangement of the fuel cell assembly 300 in Embodiment 2.

As shown in FIG. 10 and FIG. 12, with the fuel cell assembly 300 of Embodiment 2, the fuel cell unit 201 and the FC converter 90 are placed alongside in the width direction of the vehicle. However, the related device to be housed together with the fuel cell unit 201 is not limited to the FC converter 90, and an inverter or another related device may be arranged together with the fuel cell unit 201. The protection structure 310 is formed in a size that enables the housing of the fuel cell unit 201 and the FC converter 90.

As shown in FIG. 10 and FIG. 11, a sloping frame 311 is provided to the protection structure 310. Moreover, a sloping structure F is provided to the FC converter 90. Although not shown, a sloping flange structure is also provided to the fuel cell unit 201. The FC converter 90 is disposed so that its sloping flange structure F intersects with the sloping frame 311 of the protection structure 310. The fuel cell unit 201 is disposed so that its flange structure intersects with the sloping frame 311 of the protection structure 310.

Note that, in addition to arranging the fuel cell unit 201 and the FC converter 90 separately in a single protection structure 310, these may also be housed in a single housing. Moreover, the related device to be housed together with the fuel cell 20 is not limited to the FC converter 90. The configuration may be such that, in substitute for the FC converter 90 or in addition to the FC converter 90, an inverter or another related device can be housed together with the fuel cell 20.

As shown in FIG. 10 to FIG. 12, the protection structure 310 is provided with a posterior structure 320 on its rear side and an anterior structure 330 on its front side in an integrated manner. The posterior structure 320 is provided with a housing part 321 for housing the related device of the fuel cell 20. As shown in the side view of FIG. 11, in Embodiment 2, the posterior structure 320 is disposed at the rear part of the fuel cell unit 201. Thus, the footrest portion of the rear seat 104 of the dashboard 105 is formed slightly high.

The anterior structure 330 is provided with the coolant pump 35, the inverter 95, and the related device housing part 331 shown in FIG. 1. In particular, Embodiment 2 is unique in that the coolant pump 35 is disposed at the foremost side of the fuel cell assembly 300.

As shown in FIGS. 10 to 12, the coolant pump 35 is of a cylindrical shape. As a result of disposing the axial direction of this cylindrical shape to face the vehicle width direction, the circumferential surface of the cylindrical shape will face the vehicle front side. Thus, at the lower half of the coolant pump 35 disposed as described above, as with the inclined part 256 (refer to FIGS. 5 to 7) of foregoing Embodiment 1, the normal direction of the circumferential surface is facing downward. In Embodiment 2, as shown in FIG. 11, the front suspension member 112 and the fuel cell assembly 300 are arranged so that the extended line in the horizontal direction of the front suspension member 112 is positioned at the lower half of the side surface of the coolant pump 35.

(Functions of Embodiment 2)

In Embodiment 2, the coolant pump 35 functions as the first feature of the present invention. Specifically, when a crash impact is applied to the vehicle 100 from the vehicle front side, the moving direction of a related device such as the front suspension member 112 is changed to a direction that is not parallel to the forward direction; that is, to a lower direction. This is now explained with reference to FIG. 13.

Figure 13A:
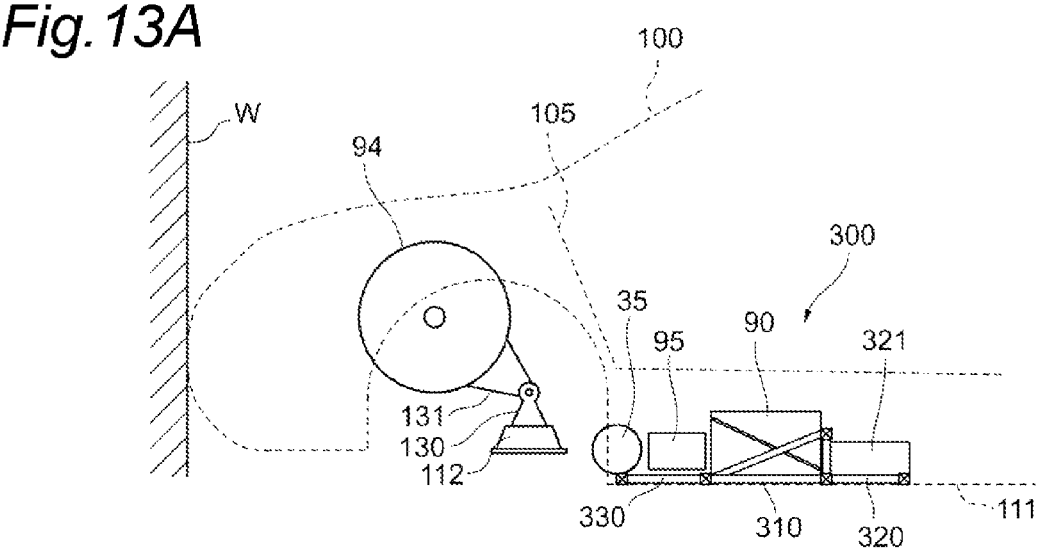
FIG. 13A is a diagram during the collision of the front surface.

FIG. 13A shows a state where the vehicle 100 collided with a wall W. As described above, a fuel cell assembly 300 is disposed at the rear of the front suspension member 112. A coolant pump 35 is disposed at the foremost part of the fuel cell assembly 300 in a manner of protruding from the anterior structure 330. At this point in time, the vehicle drive motor 94 has not yet been subject to a crash impact.

Figure 13B:
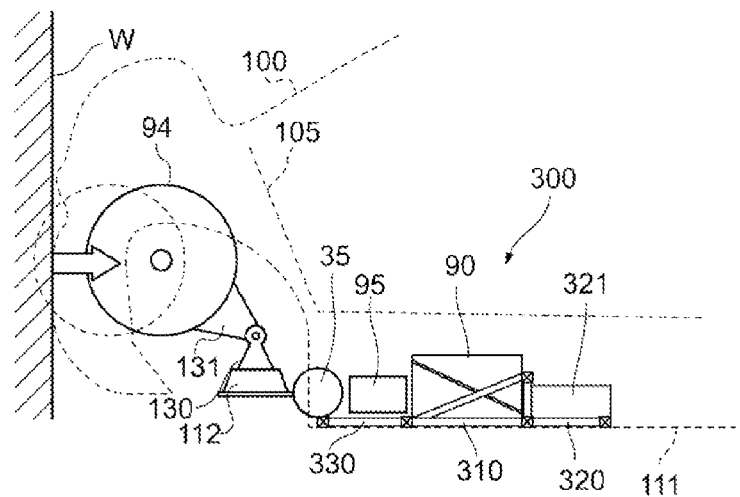
FIG. 13B is a diagram when the object reaches the position of the converter assembly.

FIG. 13B shows a state where there front side portion of the vehicle 100 is crushed and the crash impact has reached the vehicle drive motor 94. Since the vehicle drive motor 94 has a given weight, it moves backward due to inertia upon receiving a crash impact from the vehicle anterior. The vehicle drive motor 94 is mounted on the front suspension member 112 via a mounting rubber 131. Thus, the front suspension member 112 moves backward by being dragged by the vehicle drive motor 94 or upon receiving the crash impact on its own. The moving direction of the front suspension member 112 is a direction that is opposite to the advancing direction of the vehicle. Thus, when the front suspension member 112 moves a prescribed distance, it reaches the coolant pump 35 provided to the foremost part of the fuel cell assembly 300. As described above, the front suspension member 112 is positioned and arranged to come in contact with the lower half of the circumferential surface of the coolant pump when it advances from its position in a direction that is opposite to the advancing direction of the vehicle. Thus, when the front suspension member 112 is subject to a crash impact and moves backward, it comes in contact with the lower half of the circumferential surface of the coolant pump 35.

Figure 13C:
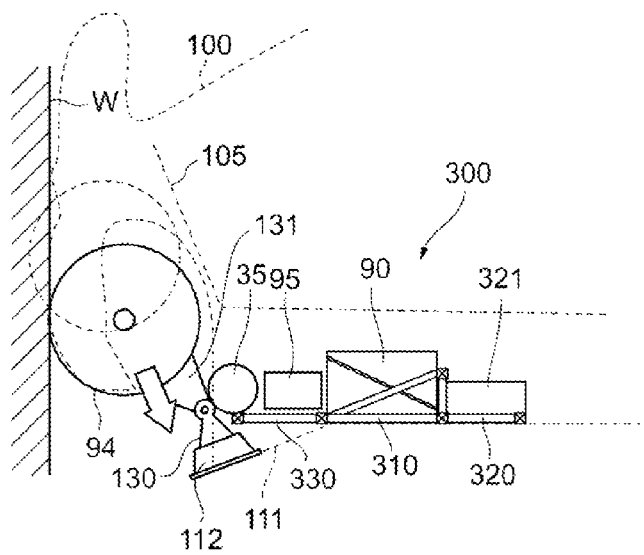
FIG. 13C is a diagram when the moving direction of the object changes.

FIG. 13C shows a state after the moving direction of the members including the vehicle drive motor 94 and the front suspension member 112 is changed. At the lower half of the circumferential surface of the coolant pump 35, its normal is facing downward. Thus, when the front suspension member 112 comes in contact with the lower half of the circumferential surface of the coolant pump 35, as shown in FIG. 13C, its moving direction faces downward. When the moving direction of the front suspension member 112 is changed to face downward, the moving direction of the vehicle drive motor 94 is dragged and also changed to face downward. When a heavy related device including the vehicle drive motor 94 moves downward, the floor panel 111 deforms in a manner of bending downward. Specifically, it moves in a direction shown with the outlined arrow of FIG. 13C.

As described above, according to Embodiment 2, since the moving direction of the front suspension member 112 and the vehicle drive motor 94 is changed to a downward and rearward direction by the coolant pump 35, it is possible to effectively inhibit the fuel cell unit 201 from becoming damaged.

In particular, according to Embodiment 2, the function pertaining to the first feature of the present invention can be yielded by effectively utilizing the circumferential surface shape of the coolant pump 35.

(Embodiment 3)

Embodiment 3 of the present invention relates to a modified example of foregoing Embodiment 2.

Figure 14:
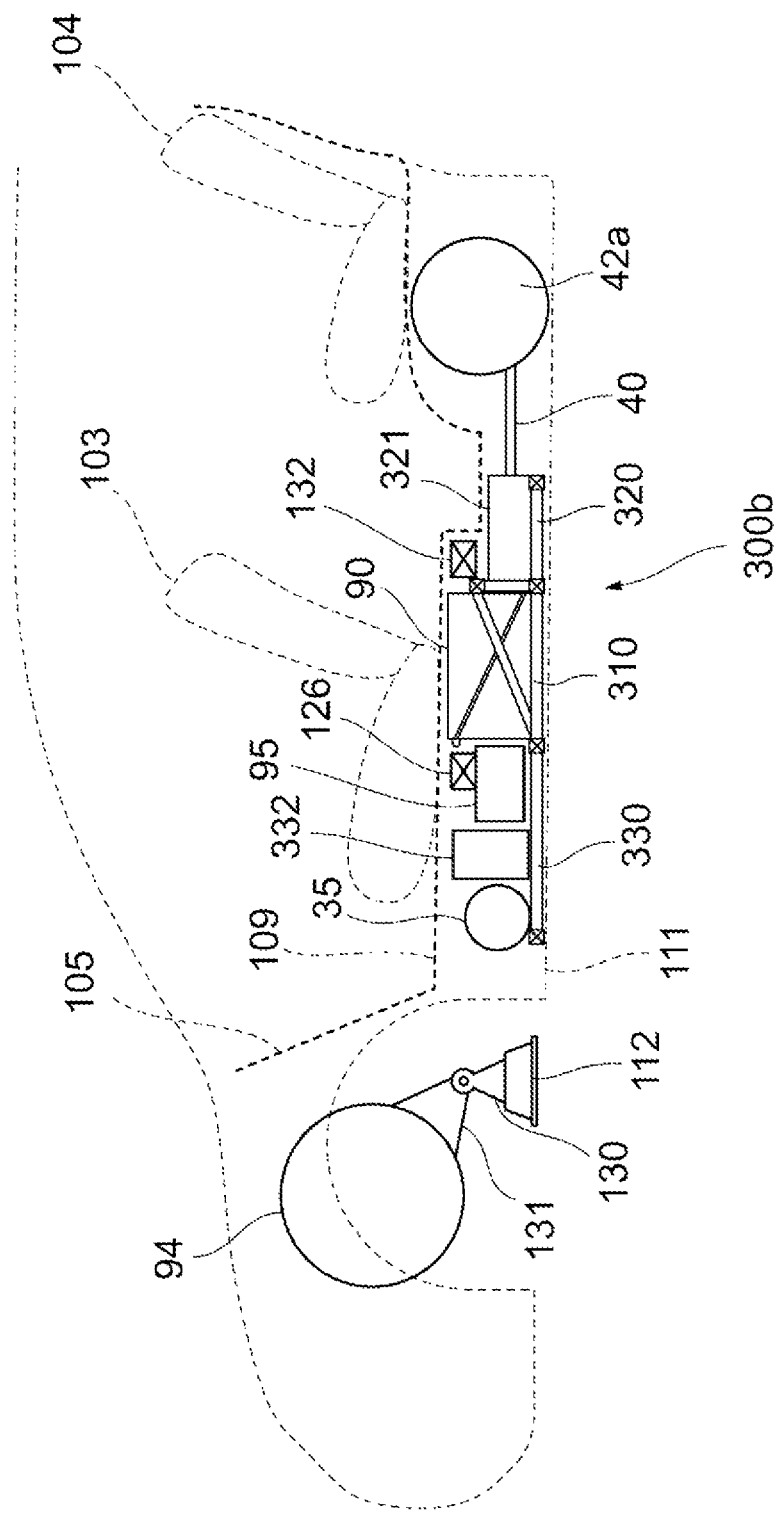
FIG. 14 is a vehicle side view explaining the arrangement of the fuel cell assembly in Embodiment 3.

FIG. 14 shows a vehicle side view of the fuel cell assembly 300b in Embodiment 3. As shown in FIG. 14, the fuel cell assembly 300b of Embodiment 3 is common with foregoing Embodiment 2 in that a posterior structure 320 and an anterior structure 330 are provided to the protection structure 310.

In the protection structure 310, the fuel cell unit 201 and the FC converter 90 are disposed alongside in the width direction of the vehicle. The posterior structure 320 is provided with a housing part 321 for housing a related device of the fuel cell 20. These are also the same as foregoing Embodiment 2.

In the anterior structure 330, a coolant pump 35, an ion exchanger 332, an inverter 95, and a related device housing part 331 are arranged. In particular, Embodiment 3 is unique in that the ion exchanger 332 is arranged at the rear part of the coolant pump 35. The ion exchanger 332 functions as a shock absorbing member for alleviating the crash impact when such crash impact is applied from the vehicle anterior.

In the foregoing configuration, when a crash impact is applied from the vehicle anterior, as explained above with reference to FIG. 13B, the front suspension member 112 moves a prescribed distance, and reaches the coolant pump 35 provided to the foremost part of the fuel cell assembly 300b.

This arrival position is the lower half of the circumferential surface of the coolant pump 35. In addition, as explained above with reference to FIG. 13C, when the front suspension member 112 comes in contact with the lower half of the circumferential surface of the coolant pump 35, its moving direction is faced downward. When the moving direction of the front suspension member 112 is changed to a downward direction, the moving direction of the vehicle drive motor 94 is also consequently changed to a downward direction.

Here, if the crash impact is great when the front suspension member 112 comes in contact with the coolant pump 35, the coolant pump 35 is subject to the impact and will move toward the vehicle posterior. Here, in Embodiment 3, an ion exchanger 332 is disposed behind the coolant pump 35. The ion exchanger 332 comprises an ion exchanging film for controlling the conductivity of the coolant, and is a member in which the coolant is filled at all times. When the coolant pump 35 is subject to the crash impact and moves backward and collides with the ion exchanger 332 at a certain level of strength, the ion exchanger 332 will become crushed. Here, since the ion exchanger 332 is filled with a large amount of coolant, the ion exchanger 332 functions as a shock absorbing member and effectively absorbs the collision energy.

As described above, according to Embodiment 3, in addition to yielding the same functions as foregoing Embodiment 2, since an ion exchanger 332 is provided behind the coolant pump 35, it can function as a shock absorbing member and effective absorb the crash impact.

(Other Modified Examples)

The present invention is not limited to the foregoing embodiments, and may be modified variously.

For example, in Embodiment 1, the structure according to the first to fourth features of the present invention was provided to the FC converter 90, but it goes without saying that such structure can also be provided to other related devices. For example, the inverter 93 and the inverter 95 are also related devices that are strongly associated with the fuel cell 20 as with the FC converter 90. Thus, the inverter 93 and the inverter 95 can be arranged on the front side of the fuel cell unit 201 in substitute for the FC converter 90 or in parallel with the FC converter 90.

Moreover, in each of the foregoing embodiments, the first to fourth features of the present invention were provided to deal with an impact from the front side of the vehicle, but the configuration is not limited thereto. The characteristic structure of the present invention can also be provided to deal with a crash impact from the lateral direction or the reverse direction of the vehicle.

Figure 15:
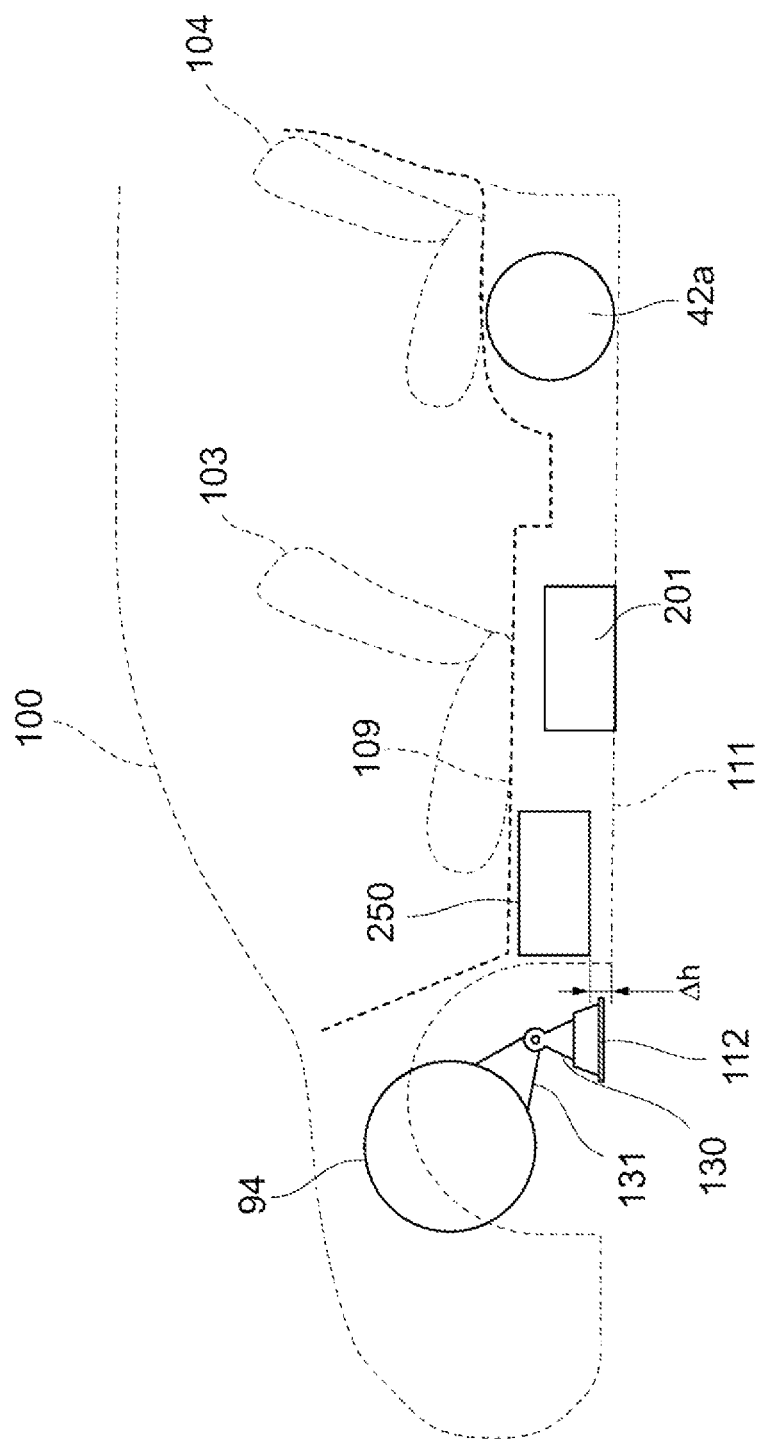
FIG. 15 is a vehicle side view explaining the arrangement of the fuel cell assembly in a modified example.

In addition, in each of the foregoing embodiments, an inclined part 256 was provided to the front side of the FC converter 90 in order to change the moving direction of the front suspension member 112. Nevertheless, even if an offset is provided in the height direction of a related device such as the FC converter 90 and the fuel cell unit 201, it is possible to exhibit the functions according to the first feature of the present invention. For example, as shown in the vehicle side view of FIG. 15, an offset of height Δh is provided between the converter assembly 250 and the fuel cell unit 201. The horizontal direction rear side of the front suspension member 112 is positioned to be lower than the bottom surface of the converter assembly 250. When an offset Δh is provided as described above, it is necessary to configure the height of the tunnel part 109 to be slightly high.

According to the foregoing configuration, when a crash impact is applied from the front side, the front suspension member 112 will slide under the converter assembly 250. Thus, it is possible to change the moving direction of the front suspension member 112 at a level where it will not collide with the fuel cell unit 201.

INDUSTRIAL APPLICABILITY

The fuel cell system of the present invention can be applied to mobile objects of other modes in addition to vehicles. As such mobile objects, there are trains, ships, aircrafts, submarines and the like. This is because, if the fuel cell system of the present invention is provided, it is possible to effectively protect the fuel cell, as the heart, from a forward crash impact regardless of the mode of such mobile object. In particular, even with a mobile object with a weight limitation, by applying the present invention, it is possible to effectively protect the fuel cell from impact by using a lightweight structure.

REFERENCE SIGNS LIST

3 . . . coolant supply system, 4 . . . fuel gas supply system, 7 . . . oxidation gas supply system, 9 . . . electric power system, 10 . . . fuel cell system, 20, 20b, 20c . . . fuel cell, 21 . . . polymer electrolyte membrane, 22 . . . anode electrode, 23 . . . cathode electrode, 24 . . . membrane electrode assembly, 25 . . . anode gas channel, 26 . . . cathode gas channel, 31 . . . cooling passage, 32 . . . temperature sensor, 33 . . . radiator, 34 . . . valve, 35 . . . coolant pump, 36 . . . temperature sensor, 40 . . . fuel gas supply line, 42 . . . fuel gas supply unit, 42a . . . first fuel gas tank, 42b . . . second fuel gas tank, 43 . . . root valve, 44 . . . pressure sensor, 45 . . . ejector, 46 . . . shutoff valve, 51 . . . circulation pathway, 52 . . . shutoff valve, 53 . . . gas-liquid separator, 54 . . . exhaust valve, 55 . . . hydrogen pump, 57 . . . rotational speed sensor, 58, 59 . . . pressure sensor, 61 . . . exhaust flow passage, 62 . . . diluter, 63 . . . purge valve, 65 . . . muffler, 71 . . . oxidation gas supply line, 72 . . . oxidation off-gas exhaust passage, 73 . . . pressure sensor, 74 . . . air cleaner, 75 . . . air compressor, 76 . . . humidifier, 77 . . . pressure regulating valve, 80 . . . control unit, 82 . . . ignition switch, 84 . . . voltage sensor, 86 . . . current sensor, 90 . . . fuel cell DC-DC converter (FC converter), 91 . . . battery, 92 . . . battery computer, 93, 95 . . . inverter, 94 . . . vehicle drive motor, 96 . . . high voltage auxiliary machine, 97 . . . relay, 98 . . . battery DC-DC converter (battery converter), high voltage auxiliary machine, 99 . . . rotational speed sensor, 100 . . . vehicle, 101 . . . front tire, 102 . . . rear tire, 103 . . . front seat, 103L . . . left-side front seat, 103R . . . right-side front seat, 104 . . . rear seat, 105 . . . dashboard, 106 . . . front pillar, 107 . . . center pillar, 108 . . . rear pillar, 109 . . . tunnel part, 110 . . . front cross member, 111 . . . floor panel, 112 . . . front suspension member, 113 . . . deformation promoting part, 114, 115 . . . front frame, 116, 117, 120, 121, 124, 125, 137, 205, 207, 228 to 233, 242 to 245 . . . fastening hole, 118, 119 . . . sub frame, 122, 123 . . . bracket, 126 . . . first cross member, 128, 129 . . . side rocker member, 130 . . . motor mount, 131 . . . mounting rubber, 132 . . . second cross member, 136 . . . third cross member, 138 . . . fourth cross member, 140, 141, 152, 153 . . . binder, 144, 151 . . . sub cross member, 146, 147 . . . rear rocker member, 150 . . . fifth cross member, 160 . . . rear cross member, 200 . . . fuel cell assembly, 201 . . . fuel cell unit, 202 . . . upper housing, 203 . . . lower housing, 204 . . . upper flange, 206 . . . lower flange, 208 . . . bolt, 209 . . . nut, 210, 211 . . . side surface, 212 . . . top surface, 213 . . . bottom surface, 214 . . . undulating shape, 215 . . . ventilation window, 216 . . . positive electrode terminal, 217 . . . negative electrode terminal, 218 . . . terminal screw, 219 . . . terminal socket, 220, 310 . . . protection structure, 221 . . . frame structure, 222 . . .

columnar member, 223 ... reinforcing frame, 224 to 227 ... fixing part, 234, 235 ... sloping frame, 236 ... mounting eye, 239 ... binder, 240 ... protection panel, 241 ... panel body, 246 ... carbon cross fiber, 250 ... converter assembly, 251 ... upper housing, 252 ... lower housing, 253 ... coolant inlet, 254 ... coolant outlet, 255 ... front surface, 256 ... inclined part, 257 ... relay part, 258 ... protruding part, 259, 282 ... power cable, 259a, 259b ... power wire, 260 ... terminal connector, 262 ... bottom surface protection plate, 263, 265, 273 ... fixing part, 264, 266 ... fastening groove, 270 ... front surface protection plate, 272 ... bend part, 274 ... fastening hole, 280, 281 ... bolt, 283 ... power plug, 300, 300b ... fuel cell assembly, 311 ... sloping frame, 320 ... posterior structure, 321 ... housing part, 330 ... anterior structure, 331 ... related device housing part, 332 ... ion exchanger, A, B ... extra length portion, F ... sloping flange structure, P ... object, S ... body

I claim:

1. A fuel cell vehicle, comprising:
   a fuel cell;
   a related device electrically connected to the fuel cell and disposed adjacent to and in front of the fuel cell,
   the related device having an inclined part on a front side, such that if a structural member of the vehicle moves backwards because of a collision impact to the vehicle, the structural member contacts the inclined part and moves downward, and
   a cross member between the fuel cell and the related device, the cross member being disposed at a position such that if the related device moves backward because of a collision impact to the vehicle, the cross member contacts a rear edge part of the related device to cause the related device to pivot downward.

2. The fuel cell vehicle according to claim 1, wherein the related device is fixed to the vehicle by at least two fastening members which are mutually spaced along the forward direction, and
   of the at least two fastening members, the fastening member that is provided on the forward direction side is configured to be unfastened with weaker force than the fastening member that is provided on an opposite side to the forward direction side.

3. The fuel cell vehicle according to claim 1, wherein the related device is provided with a protruding part on the fuel cell side, and the protruding part is provided at a position such that if the related device moves backwards or rotates because of a collision impact to the vehicle, the protruding part of the related device subjects an electrode terminal of the fuel cell to a moving force, causing the electrode terminal to move and become electrically connected with another electrode terminal, thereby creating a short circuit.

4. The fuel cell vehicle according to claim 1, wherein the related device comprises, on the fuel cell side, a short circuit part configured to be capable of short-circuiting a power source of the related device when force of a certain level or higher is applied.

5. The fuel cell vehicle according to claim 4, wherein the short circuit part is provided at a position where this part comes in contact with a part of the fuel cell based on the movement of the related device expected in a case where the vehicle collides.

6. The fuel cell vehicle according to claim 1, wherein a shock absorbing member is provided between the related device and the fuel cell.

7. The fuel cell vehicle according to claim 1, wherein the related device is a converter that is electrically connected to the fuel cell.

8. A fuel cell system mounted on a vehicle, comprising:
   a fuel cell; and
   a related device electrically connected to the fuel cell and disposed adjacent to the fuel cell,
   the related device being fixed to the vehicle by at least two fastening members which are mutually spaced along a forward direction of the vehicle, and
   of the at least two fastening members, the fastening member that is provided on the forward direction side being configured to be unfastened with weaker force than the fastening member that is provided on an opposite side to the forward direction side,
   the related device having an inclined part on a front side, and
   the related device being arranged at a position such that if a structural member of the vehicle moves backwards because of a collision impact to the vehicle, the structural member contacts the inclined part and moves downward.

9. A fuel cell system mounted on a vehicle, comprising:
   a fuel cell; and
   a related device electrically connected to the fuel cell and disposed adjacent to the fuel cell,
   the related device being provided with a protruding part on the fuel cell side, and
   the protruding part being provided at a position such that if the related device moves backwards or rotates because of a collision impact to the vehicle, the protruding part of the related device subjects an electrode terminal of the fuel cell to a moving force, causing the electrode terminal to move toward another electrode and become electrically connected with the another electrode terminal, thereby creating a short circuit.

* * * * *

UNITED STATES PATENT AND TRADEMARK OFFICE
CERTIFICATE OF CORRECTION

PATENT NO. : 8,459,399 B2  Page 1 of 1
APPLICATION NO. : 13/258539
DATED : June 11, 2013
INVENTOR(S) : Yasuhiko Ohashi It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 11 days.

Signed and Sealed this
Eighth Day of September, 2015

Michelle K. Lee
*Director of the United States Patent and Trademark Office*